(12) United States Patent
Kelly

(10) Patent No.: US 11,279,118 B2
(45) Date of Patent: Mar. 22, 2022

(54) PACKAGING FILM FOR HIGH TEMPERATURE MATERIALS

(71) Applicant: Bemis Company, Inc., Neenah, WI (US)

(72) Inventor: Scott J. Kelly, Kimberly, WI (US)

(73) Assignee: BEMIS COMPANY, INC., Neenah, WI (US)

( * ) Notice: Subject to any disclaimer, the term of this patent is extended or adjusted under 35 U.S.C. 154(b) by 0 days.

(21) Appl. No.: 16/758,581

(22) PCT Filed: Oct. 31, 2017

(86) PCT No.: PCT/US2017/059309
§ 371 (c)(1),
(2) Date: Apr. 23, 2020

(87) PCT Pub. No.: WO2019/089004
PCT Pub. Date: May 9, 2019

(65) Prior Publication Data
US 2020/0346446 A1     Nov. 5, 2020

(51) Int. Cl.
*B32B 27/32*     (2006.01)
*B32B 27/08*     (2006.01)
*B32B 27/34*     (2006.01)
(Continued)

(52) U.S. Cl.
CPC ............... *B32B 27/32* (2013.01); *B32B 7/12* (2013.01); *B32B 27/08* (2013.01); *B32B 27/34* (2013.01);
(Continued)

(58) Field of Classification Search
CPC ....... B32B 2553/00; B32B 27/32; B32B 7/12; B32B 27/08; B32B 27/34; B32B 2307/31; B32B 2307/72; B32B 15/082; B32B 15/085; B32B 15/088; B32B 15/20; B32B 2250/02; B32B 2250/03; B32B 2250/05; B32B 2255/10; B32B 2255/20; B32B 2270/00; B32B 2307/308; B32B 2307/546; B32B 2307/7244; B32B 2307/73;
(Continued)

(56) References Cited

U.S. PATENT DOCUMENTS 5,250,612 A    10/1993   Hazlitt et al.
5,866,646 A    2/1999   Radosta
(Continued)

FOREIGN PATENT DOCUMENTS

WO    2014141512 A1    9/2014
WO    2014172105 A1    10/2014
WO    20170208081 A1    12/2017

OTHER PUBLICATIONS

MItsui Chemicals, Inc. Development of Silicone-based surface modifier EXFOLA (Year: 2013).*
(Continued)

*Primary Examiner* — Yan Lan

(57) ABSTRACT

A packaging film is described. The packaging film comprises an exterior layer comprising a first polyolefin having a density of less than or equal to 0.925 g/cm³ and a first polyolefin-silicone copolymer. The packaging film is adapted for exposure to temperatures from 88° C. to 177° C. (154° F. to 350° F.). Various embodiments of the packaging film are also described.

18 Claims, 9 Drawing Sheets

(51) Int. Cl.
   *B32B 7/12*     (2006.01)
   *B65D 65/40*    (2006.01)
(52) U.S. Cl.
   CPC .......... *B65D 65/40* (2013.01); *B32B 2307/31* (2013.01); *B32B 2307/72* (2013.01); *B32B 2553/00* (2013.01)
(58) Field of Classification Search
   CPC ........ B32B 2307/732; B32B 2307/734; B32B 2307/744; B32B 2439/02; B32B 2439/46; B32B 2439/70; B32B 2535/00; B32B 27/283; B32B 27/306; B32B 27/308; B32B 27/325; B32B 27/327; B32B 27/36; B32B 3/08; B32B 7/02; B32B 7/04; B65D 65/40
   See application file for complete search history.

(56) References Cited

U.S. PATENT DOCUMENTS

| | | | |
|---|---|---|---|
| 6,599,639 | B2 | 7/2003 | Dayrit et al. |
| 8,426,519 | B2 | 4/2013 | Cogen et al. |
| 9,701,859 | B2 | 7/2017 | Chen et al. |
| 2001/0041201 | A1 | 11/2001 | Ramesh et al. |
| 2002/0187326 | A1 | 12/2002 | Kong |

OTHER PUBLICATIONS

Material requirements for VFFS and HFFS (Year: 2021).*
Mitsui Chemicals, Inc., "Development of Silicon-based Surface Modifier EXFOLA™", Feb. 25, 2013, Tokyo, Japan.

* cited by examiner

PACKAGING FILM FOR HIGH TEMPERATURE MATERIALS

The present application describes a packaging film for high temperature materials. More specifically, the present application describes a packaging film having an exterior layer comprising a first polyolefin with a specific density and a first polyolefin-silicone copolymer. The packaging film is adapted for exposure to temperatures from 68° C. to 177° C. (154° F. to 350° F.).

BACKGROUND

A heat seal is generally strongest after it has cooled to ambient temperature. However, in order for packaging equipment to operate at a commercially relevant pace, packages are often filled with product before the heat seals have had time to completely cool or completely solidify (or recrystallize). As such, the peak seal strength may be reduced. Therefore, for relatively fast-moving sealing operations, heat seals need to rapidly exhibit sufficient hot tack strength to maintain seal integrity. Otherwise, the heat seals will be destroyed by the weight of the product when the package is filled. Additionally, the films also should exhibit minimal average blocking force so that the films do not stick to films of the same or another package or to the packaging equipment.

Mitsui Chemicals, Inc. recently introduced Exfola™ silicone-based surface modifier. This material is stated to modify surfaces to assume characteristics of silicone, such as release properties, water repellency, oil repellency, and abrasion resistance. Characteristics specific to peak seal strength, hot tack strength, or average blocking force with exposure to temperatures from 68° C. to 177° C. (154° to 350° F.) are not addressed.

U.S. Pat. No. 8,426,519 (Cogen et al.) discloses copolymers, reactive blends, and crosslinkers for improved morphology in blends of silicones and polyolefins. U.S. Pat. No. 9,701,859 (Chen et al.) discloses a cable jacket polymeric composition comprising an ethylene-based polymer and a slip agent comprising a silicone and a fatty acid amide. International Publication WO 2014/141512 (Mitsui Chemicals Tohcello, Inc.) discloses a polyester release film for flexible printed circuit board that has heat resistance and does not require application of a silicone-based release agent.

SUMMARY

What is needed is a packaging film that has sufficient peak seal strength and sufficient hot tack strength but minimal average blocking force when exposed to temperatures from 68° C. to 177° C. (154° F. to 350° F.). These needs are met by the packaging film described in the present application. This packaging film sufficiently seals to package high temperature materials without unduly sticking to itself or another surface.

In a first set of embodiments, this packaging film comprises an exterior layer comprising a first polyolefin having a density of less than or equal to 0.925 g/cm$^3$ and a first polyolefin-silicone copolymer. The packaging film is adapted for exposure to temperatures from 68° C. to 177° C. (154° F. to 350° F.). In some embodiments, the first polyolefin has a density of from 0.890 g/cm$^3$ to 0.920 g/cm$^3$. In some embodiments, the first polyolefin comprises linear low density polyethylene or metallocene linear low density polyethylene. In other embodiments, the first polyolefin comprises polypropylene copolymer, polypropylene homopolymer, or a blend of such materials. In some embodiments, the first polyolefin-silicone copolymer is present in the exterior layer in an amount from 0.5% to 5.0% by weight of the exterior layer In some embodiments of the first set of embodiments, the packaging film further comprises an interior layer comprising a second polyolefin having a density of less than or equal to 0.925 g/cm$^3$ and a second polyolefin-silicone copolymer. In some of these embodiments, the packaging film has a peak seal strength of at least 21 N/15 mm (8 pounds/inch) when sealed at a seal temperature of 149° C. (300° F.) and a hot tack strength of at least 1 N/15 mm (0.40 pounds/inch) when sealed at a seal temperature of 149° C. (300° F.). In yet other of some embodiments of the first set of embodiments, the packaging film further comprises a first polyamide layer positioned between the exterior layer and the interior layer and a second polyamide layer positioned between the first polyamide layer and the interior layer. In still yet other of some embodiments of the first set of embodiments, the packaging film further comprises an inner layer comprising a third polyolefin having a density of less than or equal to 0.925 g/cm$^3$ and a third polyolefin-silicone copolymer.

In some embodiments of the first set of embodiments, the packaging film further comprises at least one additional layer comprising heat stable material, oxygen barrier material, tie material, or a blend of such materials. In some of these embodiments, the oxygen barrier material comprises polyamide, ethylene vinyl alcohol copolymer, retortable-grade ethylene vinyl alcohol copolymer, foil, oxide-coated polyester, polyglycolic acid, or a blend of such materials.

In some embodiments of the first set of embodiments, the packaging film is adapted to package products having temperatures from 68° C. to 110° C. (154° F. to 230° F.). In some embodiments, the packaging film has an average blocking force of less than 2,316 mN/15 mm (400 g/inch) when subjected to 2.72 kg (6 lbs) pressure in a 99° C. (210° F.) oven for two hours. In some embodiments, the packaging film has a kinetic COF of less than 0.50 at 82° C. (180° F.).

In some embodiments of the first set of embodiments, the packaging film comprises a blown tubular extrudate that is collapsed and flattened upon itself at two interior tubular extrudate layers and the two interior tubular extrudate layers thermally laminate to themselves to form one inner layer. In some embodiments, the packaging film comprises at least a first film and a second film wherein the first film is adhesively laminated or thermally laminated to the second film.

In some embodiments of the first set of embodiments, a package comprises the packaging film.

In a second set of embodiments, a package comprises a first wall and a second wall. The first wall and the second wall are formed from a packaging film comprising (i) an exterior layer comprising a first polyolefin having a density of less than or equal to 0.925 g/cm$^3$ and a first polyolefin-silicone copolymer in an amount from 0.5% to 5.0% by weight of the exterior layer, (ii) an interior layer comprising a second polyolefin having a density of less than or equal to 0.925 g/cm$^3$ and a second polyolefin-silicone copolymer in an amount from 0.5% to 5.0% by weight of the interior layer, (iii) a first polyamide layer positioned between the exterior layer and the interior layer, and (iv) a second polyamide layer positioned between the first polyamide layer and the interior layer. The packaging film is adapted to package products having temperatures from 68° C. to 110° C. (154° F. to 230° F.). A sheet of the packaging film has a sheet first side and an opposing sheet second side. The package of the second set of embodiments further comprises a first seal connecting the sheet first side to the sheet second side, such that the first seal is a lap seal.

In some embodiments of the second set of embodiments, the first polyolefin and the second polyolefin comprise the same polyolefin, and the first polyolefin-silicone copolymer and the second polyolefin-silicone copolymer comprise the same polyolefin-silicone copolymer.

In a third set of embodiments, a package comprises a first wall and a second wall. The first wall and the second wall are formed from a packaging film comprising (i) an exterior layer comprising a first polyolefin having a density of less than or equal to 0.925 g/cm$^3$ and a first polyolefin-silicone copolymer in an amount from 0.5% to 5.0% by weight of the exterior layer, (ii) an interior layer comprising a second polyolefin having a density of less than or equal to 0.925 g/cm$^3$ and a second polyolefin-silicone copolymer in an amount from 0.5% to 5.0% by weight of the interior layer, (iii) an inner layer positioned between the exterior layer and the interior layer and comprising a third polyolefin having a density of less than or equal to 0.925 g/cm$^3$ and a third polyolefin-silicone copolymer, (iv) at least one additional layer compromising an oxygen barrier material and positioned between the exterior layer and the inner layer, and (v) at least another additional layer compromising an oxygen barrier material and positioned between the inner layer and the interior layer. The packaging film is adapted to package products having temperatures from 68° C. to 110° C. (154° F. to 230° F.). This package further comprises a perimeter seal connecting the first wall to the second wall.

DETAILED DESCRIPTION

Figure 1:
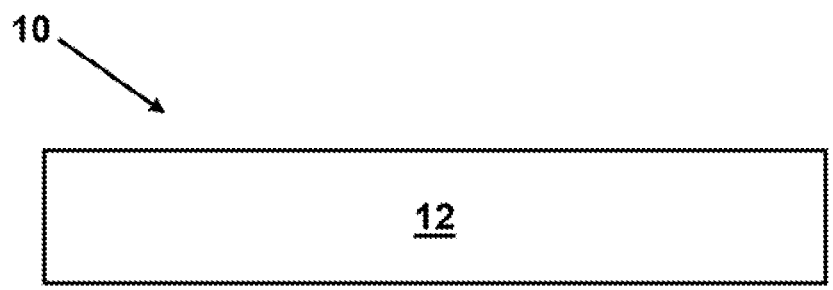
FIG. 1 is a schematic cross-sectional view of a first embodiment of a packaging film according to the present application.

Referring to the drawings, with some but not all embodiments depicted, with elements depicted as illustrative and not necessarily to scale, and with the same (or similar) reference numbers denoting the same (or similar) features throughout the drawings, FIG. 1 is a schematic cross-sectional view of a first embodiment of a packaging film according to the present application. As used throughout this application, the term "film" refers to a thermoplastic web of any thickness and is not limited to a thermoplastic web having a thickness of less than 10 mil. The term "sheet" refers to a thermoplastic web of any thickness and is not limited to a thermoplastic web having a thickness of greater than 10 mil. As used throughout this application, the term "thermoplastic" refers to a polymer or polymer mixture that softens after exposure to heat and then returns to its original condition when cooled to room temperature.

As used throughout this application, the term "package" refers to any article used to wholly or partially surround or contain an item. A package may take many, various forms. For example, the term "package" may include pouches that wholly surround or contain an item (or items) to be packaged. The term "package" may also include films, sheets, etc. that partially surround or contain an item (or items) to be packaged and, when used in conjunction with another film, sheet, etc. wholly surround or contain an item (or items). As non-limiting examples, the term "package" includes pouches, bags, trays, cups, lidding materials, plates, or other items.

In some embodiments, the packaging film described in the present application may have a thickness of from 51 micron (2 mil) to 152 micron (6 mil). In other embodiments, the packaging film described may have a thickness of from less than 51 micron (2 mil) to greater than 152 micron (6 mil).

As depicted in FIG. 1, film 10 comprises exterior layer 12. In some embodiments, film 10 may be a monolayer film; and, as such, exterior layer 12 as the only layer of film 10 is also an interior layer. In other embodiments, film 10 may be the exterior layer of a multilayer film.

As used throughout this application, the term "exterior" refers to a relative position closer to the outermost surface of a film, sheet, web, package or other article. The term "interior" refers to a relative position closer to the innermost surface of a film, sheet, web, package or other article. Accordingly, the term "exterior layer" refers to a layer comprising the outermost surface of a film, sheet, web, package, or other article, e.g., the layer to be most distant from package contents. The term "interior layer" refers to a layer comprising the innermost surface of a film, sheet, web, package, or other article, e.g., the layer to be most adjacent to package contents. Additionally, the exterior layer and the interior layer each have an inner surface and an outer surface. The term "inner surface" refers to a surface touching another layer, and the term "outer surface" refers to a surface not touching another layer. Correspondingly, the term "inner layer" refers to a layer having an inner surface on each surface and is distinct from an interior layer.

Returning to FIG. 1, exterior layer 12 comprises a first polyolefin having a density of less than or equal to 0.925 g/cm$^3$ and a first polyolefin-silicone copolymer. In some embodiments, the first polyolefin may have a density of from 0.890 g/cm$^3$ to 0.920 g/cm$^3$.

As used throughout this application, the term "polyolefin" (or "polyalkene") refers to any class of polymers produced from an alkene (or "olefin") with the general formula $C_nH_{2n}$. Non-limiting examples of polyolefins are polyethylenes and polypropylenes.

As used throughout this application, the term "polyethylene" or "PE" refers (unless indicated otherwise) to ethylene homopolymers or copolymers. Such copolymers of ethylene include copolymers of ethylene with at least one alpha-olefin and copolymers of ethylene with other units or groups such as vinyl acetate, acid groups, acrylate groups, or otherwise. The term "polyethylene" or "PE" is used without regard to the presence or absence of substituent branch groups. PE includes, for example, medium density polyethylene, high density polyethylene, low density polyethylene, ethylene alpha-olefin copolymers, ethylene vinyl acetate copolymers, ethylene acid copolymers, ethylene acrylate copolymers, cyclic olefin copolymers, or blends of such materials. Various PE's may be recycled as reclaimed PE.

As used throughout this application, the term "high density polyethylene" or "HDPE" refers to both (a) homopolymers of ethylene which have densities from 0.960 g/cm$^3$ to 0.970 g/cm$^3$ and (b) copolymers of ethylene and an alpha-olefin (usually 1-butene or 1-hexene) which have densities from 0.940 g/cm$^3$ to 0.958 g/cm$^3$. HDPE includes polymers made with Ziegler or Phillips type catalysts and polymers made with single-site metallocene catalysts. HDPE also includes high molecular weight "polyethylenes."

As used throughout this application, the term "low density polyethylene" or "LDPE" refers to branched homopolymers having densities from 0.915 g/cm$^3$ to 0.930 g/cm$^3$, as well as copolymers containing polar groups resulting from copolymerization (such as with vinyl acetate or ethyl acrylate). LDPE may contain long branches off the main chain (often termed "backbone") with alkyl substituents of two to eight carbon atoms.

As used throughout this application, the terms "copolymer of ethylene and at least one alpha-olefin" or "ethylene alpha-olefin copolymer" refer to a modified or unmodified copolymer produced by the co-polymerization of ethylene and any one or more alpha-olefins. Suitable alpha-olefins include, for example, $C_3$ to $C_{20}$ alpha-olefins such as 1-propene, 1-butene, 1-pentene, 1-hexene, 1-octene, 1-decene, or blends of such materials. The co-polymerization of ethylene and an alpha-olefin may be produced by heterogeneous catalysis, such as co-polymerization reactions with Ziegler-Natta catalysis systems, including, for example, metal halides activated by an organometallic catalyst (e.g., titanium chloride) and optionally containing magnesium chloride complexed to trialkyl aluminum. Alternatively, the co-polymerization of ethylene and an alpha-olefin may be produced by homogeneous catalysis, such as co-polymerization reactions with metallocene catalysis systems which include constrained geometry catalysts, (e.g., monocyclopentadienyl transition-metal complexes). Homogeneous catalyzed copolymers of ethylene and alpha-olefin may include modified or unmodified ethylene alpha-olefin copolymers having a long-chain branched (i.e., 8-20 pendant carbons atoms) alpha-olefin co-monomer (commercially available as, for example, Affinity™ from The Dow Chemical Company (Midland, Mich.)), linear copolymers (commercially available as, for example, Tafmer™ from the Mitsui Petrochemical Corporation (Tokyo, Japan)), or modified or unmodified ethylene alpha-olefin copolymers having a short-chain branched (i.e., 3-6 pendant carbons atoms) alpha-olefin co-monomer (commercially available as, for example, Exact™ from ExxonMobil Chemical Company (Houston, Tex.)). Ethylene alpha-olefin copolymers may include, for example, linear low density polyethylene (LLDPE), metallocene-catalyzed LLDPE (mLLDPE), very low density polyethylene (VLDPE), metallocene-catalyzed VLDPE (mVLDPE), and ultra low density polyethylene (ULDPE). In some embodiments, linear low density polyethylene (including LLDPE and mLLDPE) may have a density of from 0.910 g/cm$^3$ to 0.945 g/cm$^3$. In some embodiments, very low density and ultra low density polyethylene (including VLDPE, mVLDPE, and ULDPE) may have a density of from 0.87 g/cm$^3$ to 0.92 g/cm$^3$.

As used throughout this application, the term "ethylene vinyl acetate" or "EVA" refers to copolymers comprised of repeating units of ethylene and vinyl acetate. Ethylene vinyl acetate copolymers may be represented by the general formula: $[(CH_2-CH_2)_n-(CH_2-CH(COO)(CH_3))]_n$. The vinyl acetate content may vary from less than 10% to greater than 95% by weight (of total EVA composition). The vinyl acetate content of EVA for packaging applications may vary from 5% to 40% by weight.

As used throughout this application, the term "ethylene acid copolymers" refers to copolymers comprised of repeating units of ethylene and acid groups. The acid group content may vary from 2% to 25% by weight. Non-limiting examples of ethylene acid copolymers include ethylene methacrylic acid (EMAA) and ethylene acrylic acid (EAA).

As used throughout this application, the term "ethylene acylate copolymers" refers to copolymers comprised of repeating units of ethylene and acrylate groups. The acrylate group may be butyl-, ethyl-, methyl-, or otherwise. Non-limiting examples of ethylene acrylate copolymers include ethylene methyl acrylate (EMA) and ethylene methyl methacrylate (EMMA).

As used throughout this application the term "cyclic olefin copolymer" or "COC" refers to a class of polymeric materials based on cyclic olefin monomers and ethane, with one or more different cyclic olefin units randomly or alternately attached to an ethylene polymer backbone. Ethylene/norbornene copolymers are a non-limiting example of cyclic olefin copolymers.

As used throughout this application, the term "polypropylene" or "PP" refers to a plastomer, homopolymer, or copolymer having at least one propylene monomer linkage within the repeating backbone of the polymer. The propylene linkage may be represented by the general formula: $[CH_2-CH(CH_3)]_n$. Such polypropylene may be a polypropylene copolymer (including polypropylene impact copolymer and polypropylene random copolymer) or a polypropylene homopolymer, may be syndiotactic or isotactic, or may or may not be clarified. Various polypropylenes may have a density from 0.855 g/cm$^3$ to 0.946 g/cm$^3$. A non-limiting example of polypropylene impact copolymer includes Polypropylene 4481WZ, having a reported density of 0.905 g/cm$^3$ and available from Total Petrochemicals & Refining USA, Inc. (Houston, Tex.). A non-limiting example of polypropylene random copolymer includes Polypropylene 6281KZ, having a reported density of 0.900 g/cm$^3$ and available from Total Petrochemicals & Refining USA, Inc. (Houston, Tex.). Non-limiting examples of polypropylene homopolymer include Polypropylene H110-02NZ having a reported density of 0.900 g/cm$^3$ and available from Braskem (Philadelphia, Pa.); and Polypropylene Lumicene® M3382MZ having a reported density of 0.9 g/cm$^3$ and available from Total Petrochemicals & Refining USA, Inc. (Houston, Tex.).

Returning to FIG. 1, in some embodiments, the first polyolefin of exterior layer 12 may comprise linear low density polyethylene or metallocene linear low density polyethylene. In other embodiments, the first polyolefin of exterior layer 12 may comprise polypropylene copolymer, polypropylene homopolymer, or a blend of such materials.

As used throughout this application, the term "polyolefin-silicone copolymer" or "POSC" refers to a copolymer comprising polyolefin and silicone. Polyolefin is as described above. As used throughout this application, the term "silicone" refers to a polymer generally comprising siloxane-based monomer residue repeating units. As used throughout this application, "siloxane" refers to a monomer residue repeat unit having the following structure:

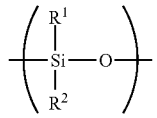

where $R^1$ and $R^2$ are independently hydrogen or a hydrocarbyl moiety. The silicone may also comprise branch points such as

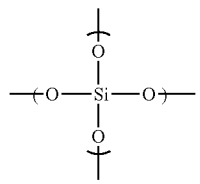

which is known as a "Q" group in silicone chemistry, or

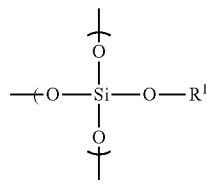

which is known as "T" group in silicone chemistry.

As used throughout this application, the term "hydrocarbyl" refers to a univalent group formed by removing a hydrogen atom from a hydrocarbon (e.g., alkyl groups, such as ethyl, or aryl groups, such as phenyl). In various embodiments, the siloxane monomer residue may be any dialkyl, diaryl, dialkaryl, or diaralkyl siloxane, having the same or differing alkyl, aryl, alkaryl, or aralkyl moieties. In various embodiments, each of $R^1$ and $R^2$ is independently a $C_1$ to $C_{20}$, $C_1$ to $C_{12}$, or $C_1$ to $C_6$ alkyl, aryl, alkaryl, or aralkyl moiety. In various embodiments, $R^1$ and $R^2$ may have the same or a different number of carbon atoms. In various embodiments, the hydrocarbyl group for each of $R^1$ and $R^2$ may be an alkyl group that is saturated and optionally straight-chain. Additionally, the alkyl group in such embodiments may be the same for each of $R^1$ and $R^2$. Non-limiting examples of alkyl groups suitable for use in $R^1$ and $R^2$ include methyl, ethyl, 1-propyl, 2-propyl, 1-buty, isobutyl, t-butyl, or blends of such materials.

The silicone described in the present application may have a density from 0.9 g/cm³ to 1 g/cm³ or from 0.95 g/cm³ to 0.98 g/cm³. Additionally, the silicone may have a kinematic viscosity at 25° C. in the range of from 10×10⁶ to 50×10⁶ centistokes ("cSt"), as determined in accordance with ASTM D445-17a ("Standard Test Method for Kinematic Viscosity of Transparent and Opaque Liquids (and Calculation of Dynamic Viscosity)").

A non-limiting example of POSC is Exfola™ silicone-based surface modifier, available from Mitsui Chemicals, Inc. (Tokyo, Japan). For the packaging film described in the present application, POSC is present in the exterior layer (e.g., exterior layer 12) in an amount from 0.5% to 5.0% by weight of the exterior layer. In other embodiments, POSC may be present in the exterior layer in an amount from 0.5% to 3.5% by weight or 0.5% to 3.0% by weight or 1.0% to 2.5% by weight of the exterior layer.

Returning to FIG. 1, film 10 is adapted for exposure to temperatures from 68° C. to 177° C. (154° F. to 350° F.). As used throughout this application, the term "adapted for exposure" refers to being capable of maintaining dimensionality and shape and not substantially distorting or deforming after exposure to specified temperatures, i.e., from 68° C. to 177° C. (154° F. to 350° F.). Such temperatures include those in retort, aseptic, hot-fill, or microwave processes as well as those in sealing operations, as each is described in the present application and known to a person of ordinary skill in the packaging arts.

As used throughout this application, the term "retort" refers to a sterilization process in which a food item packaged in a flexible package is heated to, for example, a temperature of from 104° C. to 149° C. (220° F. to 300° F.) for an extended period of time, for example, from 10 to 60 minutes, under high pressure (such as in the presence of water, steam, or pressurized steam).

As used throughout this application, the term "aseptic" refers to a process in which a packaged product and its packaging component(s) are sterilized separately and then combined in a sterile or sterilized environment to form a shelf-stable package.

As used throughout this application, the term "hot-fill" refers to a process in which a packaged component is heated to 68° C. to 110° C. (154° F. to 230° F.) and then packaged (e.g., dispensed into a package) and sealed at a slightly lower temperature, while the package maintains dimensionality and shape and does not substantially distort or deform. As such, referring to FIG. 1, in some embodiments, film 10 is adapted to package products having temperatures from 68° C. to 110° C. (154° F. to 230° F.). In other embodiments, film 10 is adapted to package products having temperatures from 77° C. to 88° C. (170° F. to 190° F.).

As used throughout this application, the term "microwave" refers to a process in which electromagnetic waves heat water or other food components (for example, fats or sugars) to the boiling point of water (212° F. (100° C.) or higher.

Figure 2A:
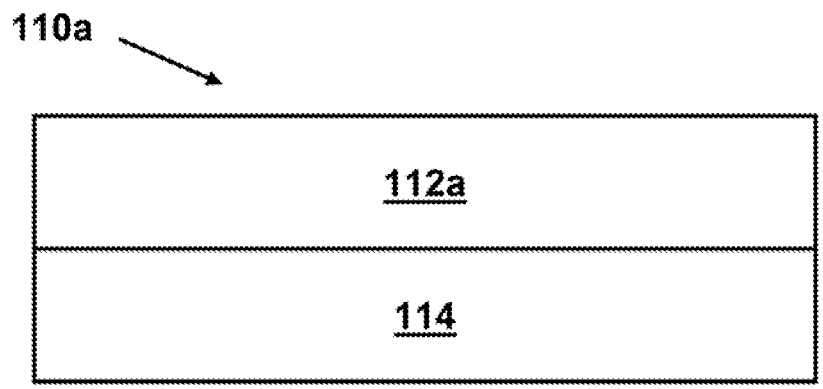
FIG. 2a is a schematic cross-sectional view of a second embodiment of a packaging film according to the present application.

Returning to the figures, FIG. 2a is a schematic cross-sectional view of a second embodiment of a packaging film according to the present application. Film 110a comprises exterior layer 112a and interior layer 114. Exterior layer 112a is as described above for exterior layer 12. In other words, exterior layer 112a comprises a first polyolefin having a density of less than or equal to 0.925 g/cm³ and a first polyolefin-silicone copolymer.

Interior layer 114 comprises a second polyolefin having a density of less than or equal to 0.925 g/cm³ and a second polyolefin-silicone copolymer. The second polyolefin is generally as described above for the first polyolefin, and the second polyolefin-silicone copolymer is generally as described above for the first polyolefin-silicone copolymer. However, in film 110a, the first polyolefin of exterior layer 112a may be specifically the same as or specifically different than the second polyolefin of interior layer 114. For example, exterior layer 112a may comprise LLDPE and interior layer 114 may comprise LLDPE; or exterior layer 112a may comprise LLDPE and interior layer 114 may comprise mLLDPE. Similarly, in film 110a, the first polyolefin-silicone copolymer of exterior layer 112a may be specifically the same as or specifically different than the second polyolefin-silicone copolymer of interior layer 114.

In some embodiments, interior layer 114 may be the sealant layer of film 110a. As used throughout this application, the term "sealant layer" refers to the specific layer of the film involved in the sealing of the film to itself or to another film or packaging component. As the sealant layer, interior layer 114 may further comprise materials in addition to the second polyolefin and the second polyolefin-silicone copolymer. As a non-limiting example, interior layer 114 may further comprise another polyolefin having a density of less than or equal to 0.925 g/cm$^3$ (as described above for the first polyolefin and the second polyolefin), a polyolefin having a density greater than 0.925 g/cm$^3$, HDPE (as described above), or cyclic olefin copolymer (as described above). In such embodiments, the composition of interior layer 114 may be, as non-limiting examples, a blend of LLDPE, LDPE and POSC, a blend of LLDPE, POSC, and HDPE, or a blend of LLDPE, POSC, and COC.

Figure 2B:
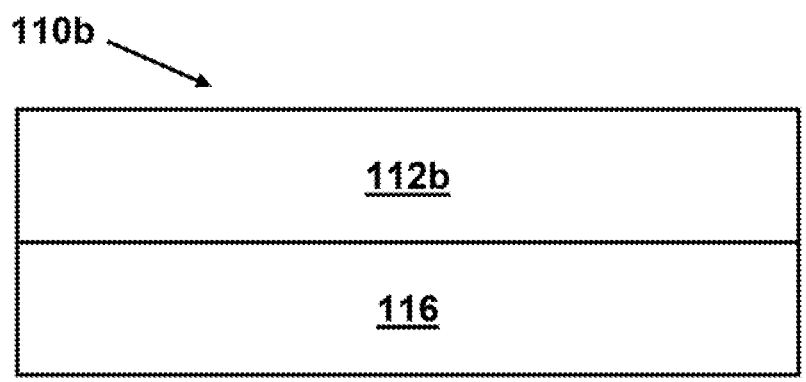
FIG. 2b is a schematic cross-sectional view of a third embodiment of a packaging film according to the present application

FIG. 2b is a schematic cross-sectional view of a third embodiment of a packaging film according to the present application. Film 110b comprises exterior layer 112b and additional layer 116. Exterior layer 112b is as described above for exterior layer 112a and exterior layer 12.

Additional layer 116 comprises heat stable material, oxygen barrier material, tie material, processing aids or other material as known to a person of ordinary skill in the packaging arts, or blends of such materials.

As used throughout this application, the term "heat stable material" refers to a material capable of maintaining dimensionality and shape and not substantially distorting or deforming after exposure to specified temperatures (i.e., from 68° C. to 177° C. (154° F. to 350° F.)). Non-limiting examples of heat stable materials include polyester and polypropylene.

As used throughout this application, the term "oxygen barrier" refers to a material capable of controlling the oxygen permeability of a film or sheet. Non-limiting examples of oxygen barrier material include polyamide, ethylene vinyl alcohol copolymer, retortable-grade ethylene vinyl alcohol copolymer, foil, oxide-coated polyester, polyglycolic acid, or blends of such materials.

As used throughout this application, the term "polyamide" or "PA" or "nylon" refers to a homopolymer or copolymer having an amide linkage between monomer units and formed by any method known in the art. The amide linkage may be represented by the general formula: [C(O)—R—C(O)—NH—R'—NH], where R and R' are the same or different alkyl (or aryl) group. Nylon polymers may be high-temperature, low-temperature or amorphous, as described in, for example, International Publication Number WO 2006/063283. Examples of nylon polymers include but are not limited to nylon 6 (polycaprolactam), nylon 11 (polyundecanolactam), nylon 12 (polyauryllactam), nylon 4,2 (polytetramethylene ethylenediamide), nylon 4,6 (polytetramethylene adipamide), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 7,7 (polyheptamethylene pimelamide), nylon 8,8 (polyoctamethylene suberamide), nylon 9,9 (polynonamethylene azelamide), nylon 10,9 (polydecamethylene azelamide), and nylon 12,12 (polydodecamethylene dodecanediamide). Examples of nylon copolymers include but are not limited to nylon 6,6/6 copolymer (polyhexamethylene adipamide/caprolactam copolymer), nylon 6,6/9 copolymer (polyhexamethylene adipamide/azelamide copolymer), nylon 6/6,6 copolymer (polycaprolactam/hexamethylene adipamide copolymer), nylon 6,2/6,2 copolymer (polyhexamethylene ethylenediamide/hexamethylene ethylenediamide copolymer), and nylon 6,6/6,9/6 copolymer (polyhexamethylene adipamide/hexamethylene azelamide/caprolactam copolymer). Examples of aromatic nylon polymers (also sometimes referred to as "amorphous polyamide" or "amorphous nylon") include but are not limited to nylon 4,I, nylon 6,I, nylon 6,6/6I copolymer, nylon 6,6/6T copolymer, nylon MXD6 (poly-m-xylylene adipamide), poly-p-xylylene adipamide, nylon 6I/6T copolymer, nylon 6T/6I copolymer, nylon MXDI, nylon 6/MXDT/I copolymer, nylon 6T (polyhexamethylene terephthalamide), nylon 12T (polydodecamethylene terephthalamide), nylon 66T, and nylon 6-3-T (poly(trimethyl hexamethylene terephthalamide).

As used throughout this application, the term "ethylene vinyl alcohol copolymer" or "EVOH" refers to copolymers comprised of repeating units of ethylene and vinyl alcohol. Ethylene vinyl alcohol copolymers may be represented by the general formula: $[(CH_2-CH_2)_n-(CH_2-CH(OH))]_n$. Ethylene vinyl alcohol copolymers may include saponified or hydrolyzed ethylene vinyl acetate copolymers. EVOH refers to a vinyl alcohol copolymer having an ethylene co-monomer and prepared by, for example, hydrolysis of vinyl acetate copolymers or by chemical reactions with vinyl alcohol. Ethylene vinyl alcohol copolymers may comprise from 28 mole percent (or less) to 48 mole percent (or greater) ethylene.

EVOH also includes but is not limited to retortable-grade EVOH. As used throughout this application, the term "retortable-grade EVOH" refers to an EVOH-containing film that can be formed into a pouch, filled with an oxygen sensitive product, sealed, and heated to, for example, a temperature of from 104° C. to 149° C. (220° F. to 300° F.) for an extended period of time, for example, from 10 to 60 minutes, under high pressure (such as in the presence of water, steam, or pressurized steam) as known by a person of ordinary skill in the shelf-stable packaging arts, without delamination of the EVOH-layer from the adjacent layers of the film, without the voiding of the EVOH and subsequent oxygen barrier loss, and without any other compromise of the EVOH during the retort process.

As used throughout this application, the term "foil" refers to alloys of metal foils. Such metal foils include but are not limited to aluminum foils.

As used throughout this application, the term "oxide-coated" refers to, for example, a coating of a metal oxide, including but not limited to aluminum oxide ($AlO_x$), silicon oxide ($SiO_x$), or blends of such materials.

As used throughout this application, the term "polyester" refers to a homopolymer or copolymer having an ester linkage between monomer units. The ester linkage may be represented by the general formula $[O-R-OC(O)-R'-C(O)]_n$ where R and R' are the same or different alkyl (or aryl) group and may generally be formed from the polymerization of dicarboxylic acid and diol monomers. The dicarboxylic acid (including carboxylic acid moieties) may be linear or aliphatic (e.g., oxalic acid, maleic acid, succinic acid, glutaric acid, adipic acid, pimelic acid, suberic acid, azelaic acid, sebacic acid, and the like) or may be aromatic or alkyl substituted aromatic (e.g., various isomers of phthalic acid, such as paraphthalic acid (or terephthalic acid), isophthalic acid, and naphthalic acid). Specific examples of a useful diol include but are not limited to ethylene glycol, propylene glycol, trimethylene glycol, 1,4-butane diol, neopentyl glycol, cyclohexane diol, 2,2,4,4-tetramethyl-1,3-cyclobutanediol, or the like. Polyesters may include a homopolymer or copolymer of alkyl-aromatic esters, including but not limited to polyethylene terephthalate (PET), oriented polyethylene terephthalate (OPET), amorphous polyethylene terephthalate (APET), glycol-modified polyethylene terephthalate (PETG), and polybutylene terephthalate (PBT); a copolymer of terephthalate and isophthalate including but not limited to polyethylene terephthalate/isophthalate copolymer, such as isophthalic acid (IPA) (modified polyethylene terephthalate (PETI)); a homopolymer or copolymer of aliphatic esters including but not limited to polylactic acid (PLA); polyhydroxyalkonates including but not limited to polyhydroxypropionate, poly(3-hydroxybutyrate) (PH3B), poly(3-hydroxyvalerate) (PH3V), poly(4-hydroxybutyrate) (PH4B), poly(4-hydroxyvalerate) (PH4V), poly(5-hydroxyvalerate) (PH5V), poly(6-hydroxydodecanoste) (PH6D); or blends of any of these materials.

As used throughout this application, the term "polyglycolic acid" (or "PGA") refers to a biodegradable, thermoplastic polymer that is the simplest linear, aliphatic polyester. In packaging films, PGA offers high gas barrier to carbon dioxide and oxygen, controllable hydrolysis, and excellent mechanical strength.

As used throughout this application, the term "tie material" or "tie" refers to a polymeric material serving a primary purpose or function of adhering two surfaces to one another, such as the planar surfaces of two sheet or film layers. For example, a tie material adheres one sheet layer surface to another sheet layer surface or one area of a sheet layer surface to another area of a sheet layer surface. Tie material may comprise any polymer, homopolymer, copolymer, or blend of polymers having a polar group or any other polymer, homopolymer, copolymer, or blend of polymers, including modified and unmodified polymers (such as grafted copolymers) which provide sufficient interlayer adhesion to adjacent layers comprising otherwise non-adhering polymers.

Figure 3:
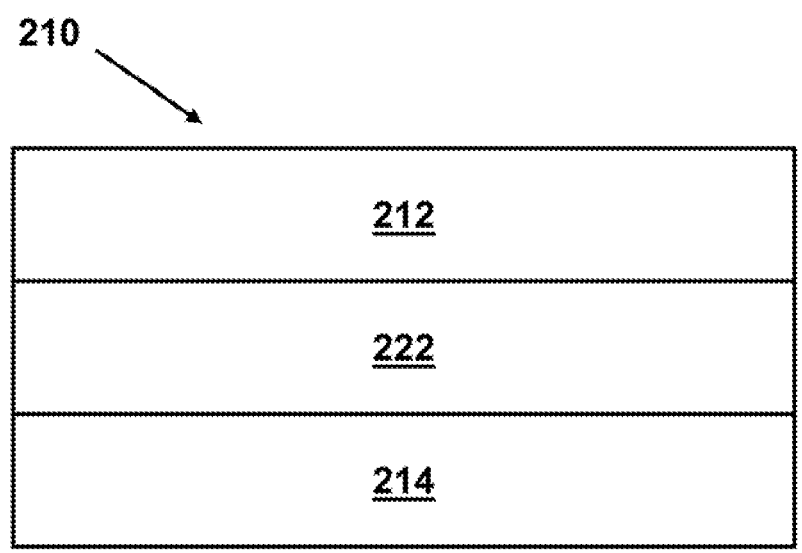
FIG. 3 is a schematic cross-sectional view of a fourth embodiment of a packaging film according to the present application.

Returning to the figures, FIG. 3 is a schematic cross-sectional view of a fourth embodiment of a packaging film according to the present application. Film 210 comprises exterior layer 212, interior layer 214, and inner layer 222.

Exterior layer 212 is as described above for exterior layer 12, exterior layer 112a, and exterior layer 112b. Interior layer 214 is as described above for interior layer 114. In other words, interior layer 214 comprises a second polyolefin having a density of less than or equal to 0.925 g/cm$^3$ and a second polyolefin-silicone copolymer. As described above, the first polyolefin of exterior layer 212 may be specifically the same as or specifically different than the second polyolefin of interior layer 214, and the first polyolefin-silicone copolymer of exterior layer 212 may be specifically the same as or specifically different than the second polyolefin-silicone copolymer of interior layer 214. As such, film 210 may palindromic or non-palindromic.

As used throughout this application, the term "palindromic" refers to a structure having substantially symmetrical layers. Non-limiting examples of palindromic films are films having the layer configurations A/B/A, A/B/B/A, A/B/C/B/A, A/B/C/D/E/D/C/F/C/D/E/D/C/B/A, etc. A non-limiting example of non-palindromic film is a film having the layer configuration A/B/C/A.

Inner layer 222 comprises a third polyolefin having a density of less than or equal to 0.925 g/cm$^3$ and a third polyolefin-silicone copolymer. The third polyolefin of inner layer 222 is generally as described above for the first polyolefin and the second polyolefin, and the third polyolefin-silicone copolymer is generally as described above for the first polyolefin-silicone copolymer and the second polyolefin-silicone copolymer. However, in film 210, the third polyolefin of inner layer 222 may be specifically the same as or specifically different than either the first polyolefin of exterior layer 212 or the second polyolefin of interior layer 214. For example, exterior layer 212 and interior layer 214 may each comprise LLDPE while inner layer 222 may comprise mLLDPE; or each of exterior layer 212, interior layer 214, and inner layer 222 may comprise ULDPE. Similarly, in film 210, the third polyolefin-silicone copolymer of inner layer 222 may be specifically the same as or specifically different than either the first polyolefin-silicone copolymer of exterior layer 212 or the second polyolefin-silicone copolymer of interior layer 214.

In some embodiments, inner layer 222 may be formed as a result of a blown tubular extrudate collapsing and flattening upon itself at two interior tubular extrudate layers, and the two interior tubular extrudate layers thermally laminating to themselves to form inner layer 222, resulting in a "collapsed bubble," palindromic, multilayer film on a single packaging film roll. As such, in some embodiments, inner layer 222 may further comprise materials in addition to the third polyolefin and the third polyolefin-silicone copolymer. As a non-limiting example, inner layer 222 layer may further comprise another polyolefin having a density of less than or equal to 0.925 g/cm$^3$ (as described above for the first polyolefin, the second polyolefin, and the third polyolefin) or a polyolefin having a density greater than 0.925 g/cm$^3$. In such embodiments, the composition of inner layer 222 may be, as a non-limiting example, a blend of a first LLDPE, a second LLDPE, POSC, and EVA.

Figure 4:
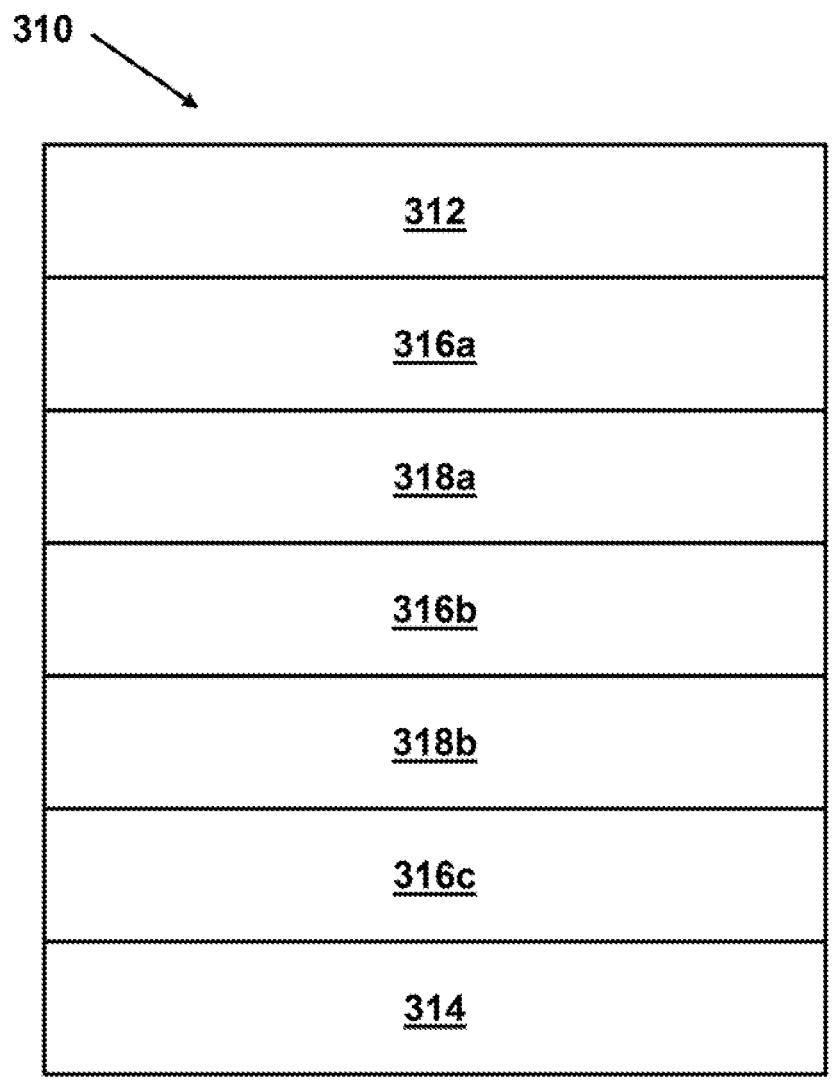
FIG. 4 is a schematic cross-sectional view of a fifth embodiment of a packaging film according to the present application.

FIG. 4 is a schematic cross-sectional view of a fifth embodiment of a packaging film according to the present application. Film 310 compromises exterior layer 312, interior layer 314, first additional layer 316a, second additional layer 316b, third additional layer 316c, first polyamide layer 318a, and second polyamide layer 318b. First polyamide layer 318a is positioned between exterior layer 312 and interior layer 314, and second polyamide layer 318b is positioned between first polyamide layer 318a and interior layer 314.

Exterior layer 312 is as described above for exterior layer 12, exterior layer 112a, exterior layer 112b, and exterior layer 212. Interior layer 314 is as described above for interior layer 114 and interior layer 214.

First additional layer 316a, second additional layer 316b, and third additional layer 316c are generally as described above for additional layer 116. In other words, each may comprise heat stable material, oxygen barrier material, tie material, processing aids or other material as known to a person of ordinary skill in the packaging arts, or blends of such materials. In a non-limiting example of film 310, each of first additional layer 316a, second additional layer 316b, and third additional layer 316c may comprise tie material. In another non-limiting example of film 310, each of first additional layer 316a and third additional layer 316c may comprise tie material, and second additional layer 316b may comprise oxygen barrier material.

First polyamide layer 318a and second polyamide layer 318b each comprises polyamide, as described above. The polyamide of first polyamide layer 318a may be specifically the same as or specifically different than the polyamide of second polyamide layer 318b. As a non-limiting example, each of first polyamide layer 318a and second polyamide layer 318b may comprise a polyamide or a blend or two or more polyamides. As a further non-limiting example, each of first polyamide layer 318a and second polyamide layer 318*b* may comprise nylon 6 or each may comprise a blend of nylon 6 and nylon 6/6,6. Alternatively, first polyamide layer 318*a* may comprise nylon 6 and second polyamide layer 318*b* may comprise a blend of nylon 6 and nylon 6/6,6.

In some embodiments, film 310 may be palindromic. In other embodiments, film 310 may be non-palindromic.

Figure 5:
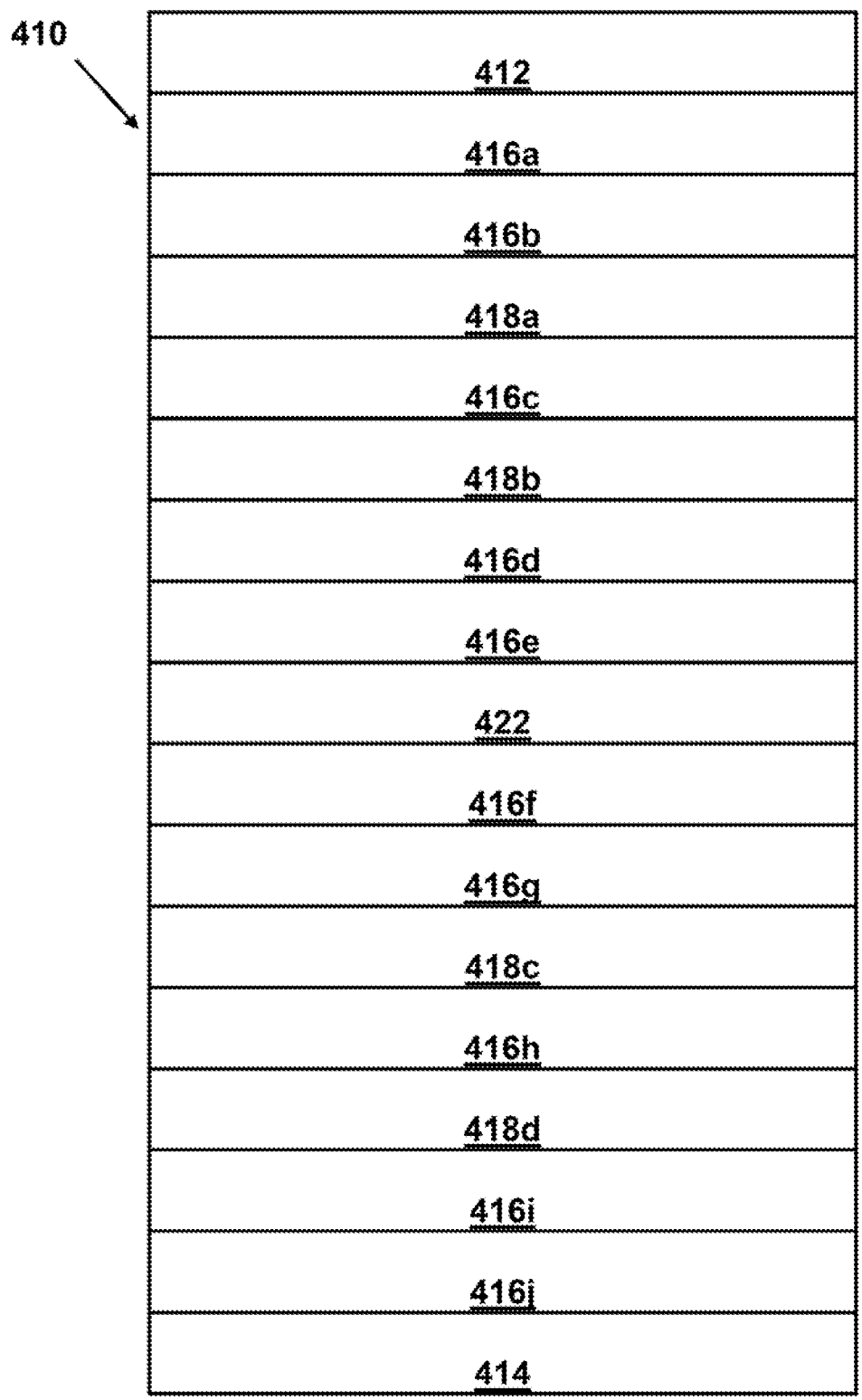
FIG. 5 is a schematic cross-sectional view of a sixth embodiment of a packaging film according to the present application.

FIG. 5 is a schematic cross-sectional view of a sixth embodiment of a packaging film according to the present application. Film 410 compromises exterior layer 412, interior layer 414, first additional layer 416*a*, second additional layer 416*b*, third additional layer 416*c*, fourth additional layer 416*d*, fifth additional layer 416*e*, sixth additional layer 416*f*, seventh additional layer 416*g*, eighth additional layer 416*h*, ninth additional layer 416*i*, tenth additional layer 416*j*, first polyamide layer 418*a*, second polyamide layer 418*b*, third polyamide layer 418*c*, fourth polyamide layer 418*d*, and inner layer 422.

Exterior layer 412 is as described above for exterior layer 12, exterior layer 112*a*, exterior layer 112*b*, exterior layer 212, and exterior layer 312. Interior layer 414 is as described above for interior layer 114, interior layer 214, and interior layer 314.

First additional layer 416*a*, second additional layer 416*b*, third additional layer 416*c*, fourth additional layer 416*d*, fifth additional layer 416*e*, sixth additional layer 416*f*, seventh additional layer 416*g*, eighth additional layer 416*h*, ninth additional layer 416*i*, and tenth additional layer 416*j* are generally as described above for additional layer 116, first additional layer 316*a*, second additional layer 316*b*, and third additional layer 316*c*. In a non-limiting example of film 410, each of first additional layer 416*a*, fifth additional layer 416*e*, sixth additional layer 416*f*, and tenth additional layer 416*j* may comprise processing aids (such as, as a non-limiting example, slip agent). In such non-limiting example of film 410, each of second additional layer 416*b*, fourth additional layer 416*d*, seventh additional layer 416*g*, and ninth additional layer 416*h* may comprise tie material. Additionally, in such non-limiting example of film 410, each of third additional layer 416*c* and eighth additional layer 416*g* may comprise oxygen barrier material. Third additional layer 416*c* comprising oxygen barrier material is positioned between exterior layer 412 and inner layer 422, and eighth additional layer 416*g* comprising oxygen barrier material is positioned between inner layer 422 and interior layer 414.

First polyamide layer 418*a*, second polyamide layer 418*b*, third polyamide layer 418*c*, and fourth polyamide layer 418*d* each comprises polyamide, as described above; and each is as described above for first polyamide layer 318*a* and second polyamide layer 318*b*. In other words, the polyamide of any polyamide layer may be specifically the same as or specifically different than the polyamide of another polyamide layer, and each may comprise a polyamide or a blend or two or more polyamide.

Inner layer 422 is as described above for inner layer 222. In other words, inner layer 422 comprises a third polyolefin having a density of less than or equal to 0.925 g/cm$^3$ and a third polyolefin-silicone copolymer. Inner layer 422 is positioned between exterior layer 412 and interior layer 414.

In some embodiments, film 410 may be palindromic. In other embodiments, film 410 may be non-palindromic.

The packaging film described in the present application may be produced by various methods, including but not limited to blown film extrusion or coextrusion, cast extrusion or coextrusion, lamination, coating, etc.

As a non-limiting example, in the blown film coextrusion process, various resins are heated and extruded through various dies to form a multilayer coextruded tubular extrudate (or "bubble" or "blown bubble"). In some embodiments, the blown tubular extrudate is collapsed and flattened upon itself at the two interior tubular extrudate layers, and the two interior tubular extrudate layers thermally laminate to themselves to form one inner layer, resulting in a "collapsed bubble," palindromic, multilayer film on a single packaging film roll. In other embodiments, the tubular extrudate is collapsed and flattened without the two inner tubular extrudate layers thermally laminating to form one inner layer. In such embodiments, the flattened tubular extrude is slit to form two separate plies, with each separate ply on a separate packaging film roll or with each separate ply double wound on a single packaging film roll.

In some embodiments, the packaging film is non-oriented; in other words, no additional orientation is introduced other than that inherent in the typical blown film coextrusion process.

As a further non-limiting example, in the lamination process, a first film (such as, a blown film, a cast film, or otherwise) and a second film (such as, a blown film, a cast film, or otherwise) are acquired or produced. In some embodiments, the first film may be adhesively laminated to the second film to produce a roll of packaging film. In other embodiments, the first film may be thermally laminated to the second film to product a roll of packaging film.

No matter the method of producing, the packaging film described in the present application may be used in any one of a variety of packaging configurations (or packages) known to a person of ordinary skill in the packaging arts. In some embodiments, such packaging configurations may be formed via high-speed continuous motion packaging equipment having package output of from 50 to 100 or from 50 to 80 packages per minute. In other embodiments, other packaging equipment may be used such that the package output is from 25 to 50 or 25 to 40 packages per minute.

Possible packaging configurations include but are not limited to horizontal-form-fill-seal package, vertical form-fill-seal package, lap-seal package, fin-seal package, quad-seal package, three-side-seal package, four-side-seal package, quad-pack, pouch, stand-up pouch, K-seal pouch, doyen-style pouch, side-gusset pouch, pillow pouch, stick pack, sachet, forming/non-forming package, thermoformed tray with lid, or other packaging configurations known to a person of ordinary skill in the packaging arts. With the various packaging configurations, a first edge, a second edge, a third edge, and a fourth edge of the package may take various forms. Such forms include but are not limited to a seal (e.g., an ultrasonic seal, a heat seal, a pressure seal or other seal known to a person of ordinary skill in the packaging arts) connecting a first wall to a second wall, a fold between and connecting a first wall to a second wall, a gusset member formed or plowed in a fold between and connecting a first wall to a second wall, a gusset member inserted and sealed between and connecting a first wall to a second wall, other sealing or connecting forms or means known to a person of ordinary skill in the packaging arts, or combinations of the above.

Figure 6:
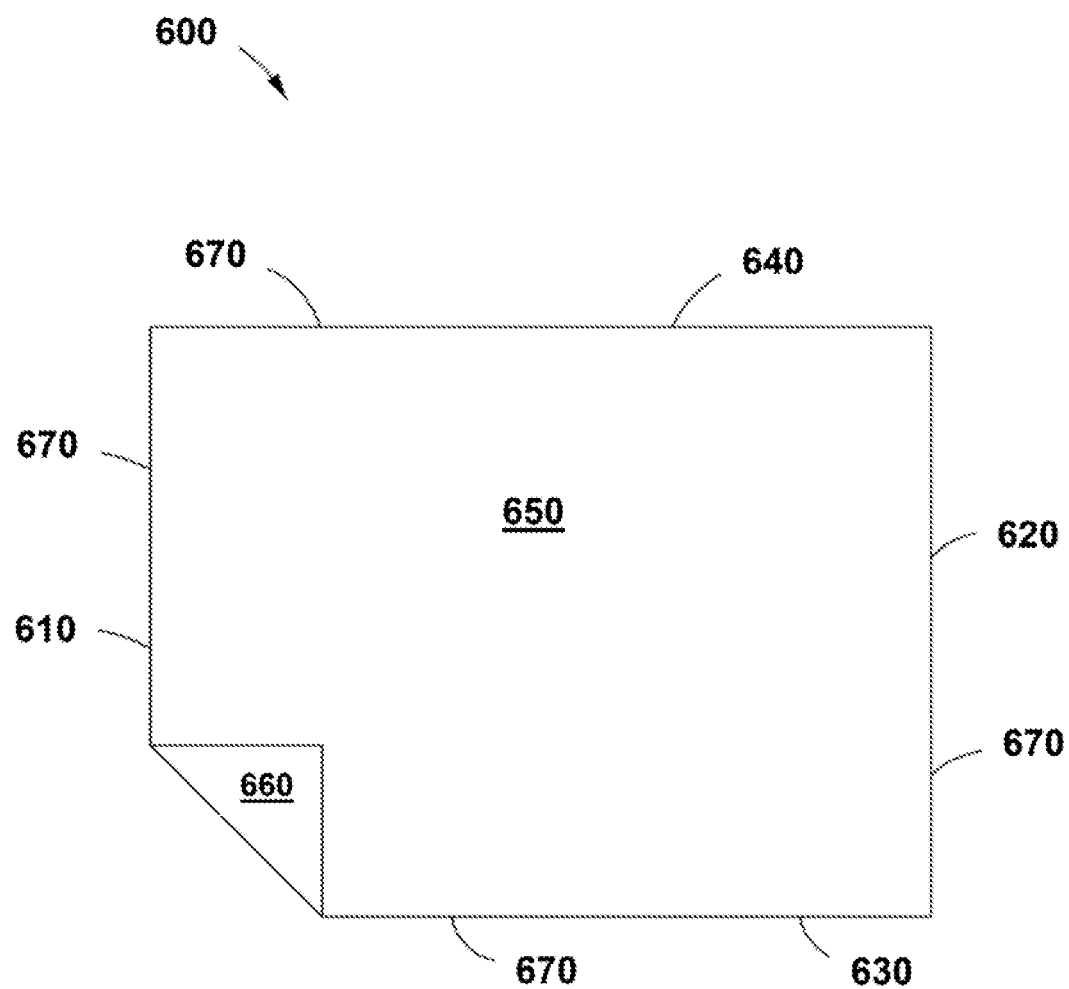
FIG. 6 is a schematic top view of a sheet of an embodiment of the packaging film described in the present application.
Figure 7:
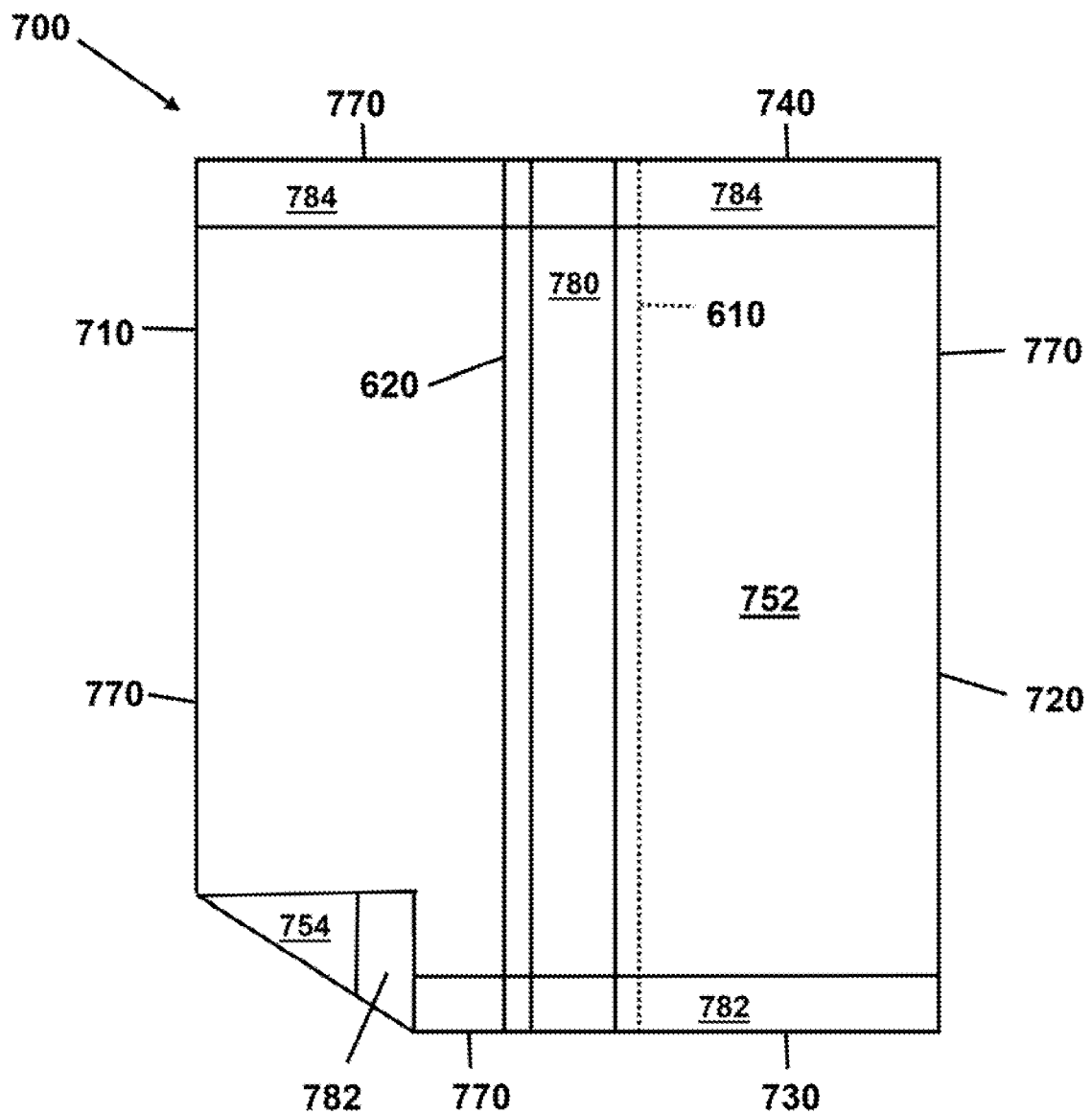
FIG. 7 is a schematic top view of a lap seal package formed from the sheet of FIG. 6.

In one embodiment, the packaging film (such as, as a non-limiting example, film 310 of FIG. 4 as described above) may be used to form a lap-seal package. FIG. 6 is a schematic top view of a sheet (such as a section or portion) of an embodiment of the packaging film described in the present application from which a lap-seal package may be formed. In some manufacturing embodiments, such as those to form, fill, and seal a lap-seal package, the package is formed from a section of packaging film; however, the section of packaging film is not cut from the packaging film prior to producing the package. As known to a person of ordinary skill in the packaging arts, the package is produced from a roll of packaging film. FIG. 6 depicts a separate sheet only to illustrate and explain the formation of a lap-seal package. FIG. 7 is a schematic top view of a lap seal package formed from the sheet of FIG. 6.

As depicted in FIG. 6, sheet 600 has an up-turned corner. Sheet 600 comprises sheet first side 610, sheet second side 620 opposing sheet first side 610, sheet third side 630 substantially perpendicular to sheet first side 610 and sheet second side 620, and sheet fourth side 640 opposing sheet third side 630. Sheet 600 also has a sheet first surface 650 circumscribed by sheet perimeter 670 formed by sheet first side 610, sheet second side 620, sheet third side 630, and sheet fourth side 640 with an opposing sheet second surface 660 also circumscribed by sheet perimeter 670.

As depicted in FIG. 7, package 700 is a lap-seal package formed from sheet 600 of FIG. 6. Package 700 is a sealed package with an up-turned corner. Package 700 comprises first wall 752 and second wall 754. FIG. 7 depicts first wall 752 facing out and second wall 754 facing in. Package 7 is formed by connecting (i.e., overlapping) sheet first side 610 with sheet second side 620 to form first seal 780 (in first wall 752) and contiguous first wall 752 and contiguous second wall 754. In FIG. 7, sheet first side 610 is depicted as a dashed line as it is overlapped by sheet second side 620 and sheet first surface 650. As such, first seal 780 of package 700 comprises a lap seal. In other embodiments, first seal 780 may comprise a fin seal, a butt-seal tape, a seal strip, or other seal configuration as known to a person of ordinary skill in the packaging arts such that sheet first side is connected to sheet second side to form a contiguous first wall and a contiguous second wall. Such various first seal configurations are further described in U.S. Pat. No. 7,527,839 (Busche et al.).

Package 700 further comprises perimeter 770 comprising first edge 710, second edge 720 opposing first edge 710, third edge 730 substantially perpendicular to first edge 710 and second edge 720, and fourth edge 740 opposing third edge 730.

In the embodiment of FIG. 7, first edge 710 comprises a first edge fold between and connecting first wall 752 to second wall 754. In other embodiments, first edge 710 may comprise a gusset member formed or plowed in a fold between and connecting first wall 752 to second wall 754. In the embodiment of FIG. 7, second edge 720 comprises a second edge fold between and connecting first wall 752 to second wall 754. In other embodiments, second edge 720 may comprise a gusset member formed or plowed in a fold between and connecting first wall 752 to second wall 754. In the embodiment of FIG. 7, third edge 740 comprises first end seal 782 connecting first wall 752 to second wall 754. In other embodiments, third edge 730 may comprise a gusset member inserted and sealed between and connecting first wall 752 to second wall 754. In the embodiment of FIG. 7, fourth edge 740 comprises second end seal 784. In other embodiments fourth edge 740 may comprise a gusset member inserted and sealed between and connecting first wall 752 to second wall 754.

Figure 8:
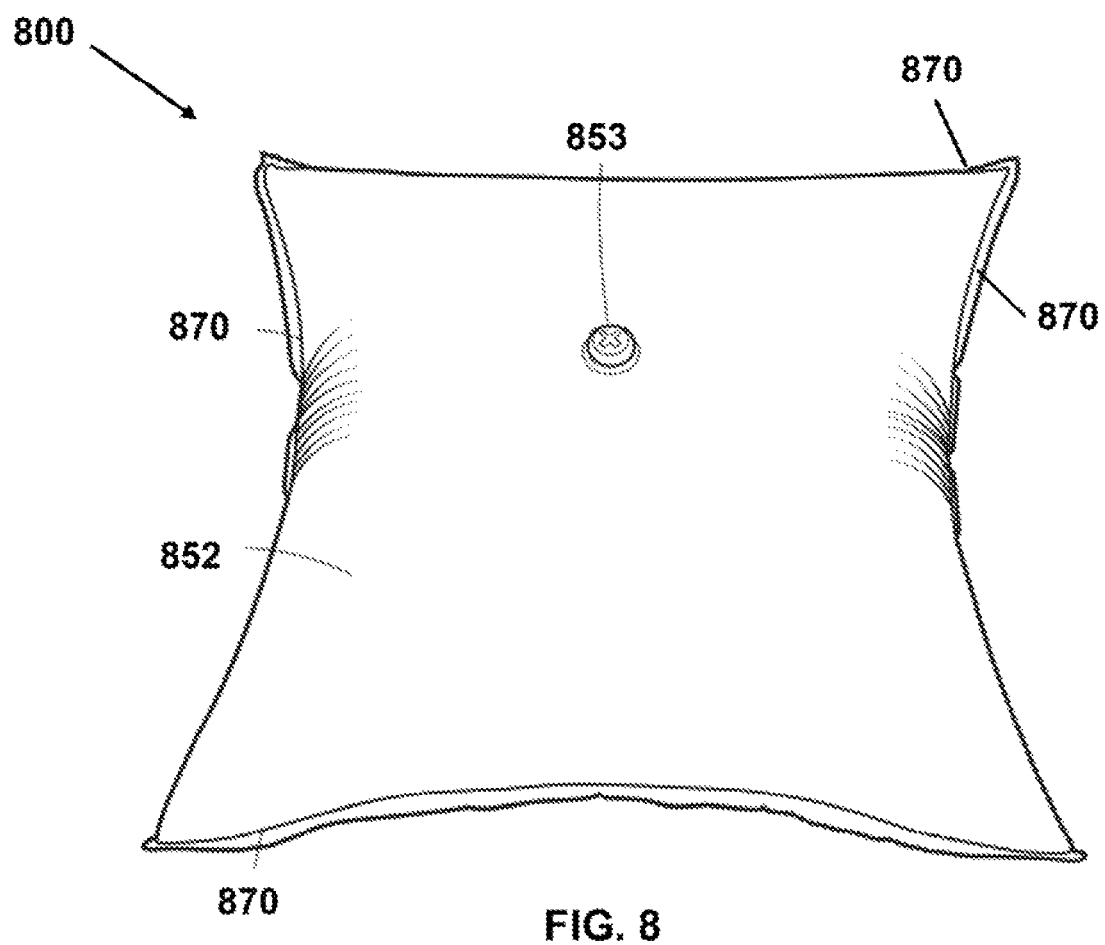
FIG. 8 is a schematic top view of a liner for a bulk container formed from an embodiment of the packaging film described in the present application.

In another embodiment, the packaging film (such as, as a non-limiting example, film 410 in FIG. 5 as described above) may be used to form a liner for a bulk container such as a drum or a rigid intermediate bulk container (IBC). FIG. 8 is a schematic top view of a liner for a bulk container formed from an embodiment of the packaging film described in the present application. Liner 800 comprises a first wall 852 that is connected to a second wall (not shown) at perimeter seal 870. In the embodiment of FIG. 8, fitment 853 is attached to first wall 852; however, in other embodiments, a fitment is optional and may or may not be included as part of the liner.

The various embodiments of the packaging film described in the present application may exhibit various properties, as exemplified and further described in the Examples below.

For example, a packaging film comprising an exterior layer comprising a first polyolefin having a density of less than or equal to 0.925 g/cm$^3$ and a first polyolefin-silicone copolymer may have a water contact angle of greater than 90°.

As used throughout this application, the term "water contact angle" (or "wetting angle") refers to the angle between the surface of the liquid (i.e., water) and the outline of the contact surface (i.e., the exterior surface of the film). For the present application, water contact angle was determined by use of a goniometer, as known by a person of ordinary skill in the analytical chemistry arts. Water contact angle may be reported in degrees (°). Generally, if the water contact angle is less than 90°, the contact surface is considered hydrophilic and if the water contact angle is greater than 90°, the contact surface is considered hydrophobic. Many polymers exhibit hydrophobic surfaces.

As an additional example, a packaging film comprising an exterior layer comprising a first polyolefin having a density of less than or equal to 0.925 g/cm$^3$ and a first polyolefin-silicone copolymer and an interior layer comprising a second polyolefin having a density of less than or equal to 0.925 g/cm$^3$ and a second polyolefin-silicone copolymer may have a peak seal strength of at least 21 N/15 mm (8 pounds/inch) when sealed at a seal temperature of 149° C. (300° F.) or a peak seal strength of from 21 N/15 mm (8 pounds/inch) to 45 N/15 mm (17.4 pounds/inch) when sealed at a seal temperature of 149° C. (300° F.) or a peak seal strength of from 21 N/15 mm (8 pounds/inch) to 38 N/15 mm (14.7 pounds/inch) when sealed at a seal temperature of 149° C. (300° F.).

As used throughout this application, the term "peak seal strength" refers to the maximum (or peak) force required to separate a seal after the seal has formed and cooled to ambient temperature. (As used throughout this application, the term "ambient temperature" generally refers to a surrounding environment or room temperature of about 20-25° C. (about 68-77° F.).) For the present application, seals for various packaging films (e.g., the film of Example 1 (as further described in the Examples section below) to the film of Example 1) were created at various temperatures (as noted in TABLE 3 below) at a pressure of 40 psi and a 0.7 second dwell time). Peak seal strength was then determined in accordance with ASTM F88-15 ("Standard Test Method for Seal Strength of Flexible Barrier Materials"). Peak seal strength values may be reported in Newtons (N) (15 millimeters (mm) (or pounds per inch (or inch-pound)). A higher peak seal strength value generally reflects a stronger seal.

As a yet additional example, a packaging film comprising an exterior layer comprising a first polyolefin having a density of less than or equal to 0.925 g/cm$^3$ and a first polyolefin-silicone copolymer and an interior layer comprising a second polyolefin having a density of less than or equal to 0.925 g/cm$^3$ and a second polyolefin-silicone copolymer may have a hot tack strength of at least 1 N/15 mm (0.40 pounds/inch) when sealed at a seal temperature of 149° C. (300° F.) or a hot tack strength of from 1 N/15 mm (0.40 pounds/inch) to 10 N/15 mm (3.9 pounds/inch) when sealed at a seal temperature of 149° C. (300° F.) or a hot tack strength of from 1 N/15 mm (0.40 pounds/inch) to 5 N/15 mm (1.9 pounds/inch) when sealed at a seal temperature of 149° C. (300° F.).

As used throughout this application, the term "hot tack strength" refers to the force required to separate a seal after the sealed has formed but before it has cooled to ambient temperature. For the present application, seals for various packaging films (e.g., the film of Example 1 to the film of Example 1) were created at various temperatures (as noted in TABLE 4 below) at a pressure of 40 psi, a 0.70-0.75 second dwell time, and a 0.2-0.3 second cool time). Hot tack strength was then determined in accordance with F1921 ("Standard Test Methods for Hot Seal Strength (Hot Tack) of Thermoplastic Polymers and Blends Comprising the Sealing Surfaces of Flexible Webs"). Hot tack strength values may be reported in Newtons (N)/15 millimeters (mm) (or pounds per inch (or inch-pound)). A higher hot tack strength value generally reflects a stronger tack or seal.

As a further example, a packaging film comprising an exterior layer comprising a first polyolefin having a density of less than or equal to 0.925 g/cm$^3$ and a first polyolefin-silicone copolymer may have an average blocking force of less than 2,316 mN/15 mm (400 g/inch) when subjected to 2.72 kg (6 lbs) pressure in a 99° C. (210° F.) oven for two hours or an average blocking force of from 60.8 mN/15 mm (10.5 g/inch) to less than 2,316 mN/15 mm (400 g/inch) when subjected to 2.72 kg (6 lbs) pressure in a 99° C. (210° F.) oven for two hours or an average blocking force of from 0 mN/15 mm (0 g/inch) to less than 2,316 mN/15 mm (400 g/inch) when subjected to 2.72 kg (6 lbs) pressure in a 99° C. (210° F.) oven for two hours.

As used throughout this application, the term "average blocking force" refers to the average force required to separate a packaging film described in the present application from itself after being subjected to heat and pressure. For the present application, various packaging films were placed in a blocking jig (such as a K53000 I.C. Block Tester, available from Koehler Instrument Company, Inc. (Holtsville, N.Y.)) and subjected to various kilograms (or pounds) pressure via a spring loaded jig. The blocking jig with the packaging films was then placed in an oven at various temperatures for various times. Once removed from the oven, the average force required to separate the packaging films was determined in accordance with ASTM F88-15 ("Standard Test Method for Seal Strength of Flexible Barrier Materials"), using Technique B. With Technique B, each tail of the specimen was secured in opposing grips and the tail was hand-supported at a 90° perpendicular angle to the tails while the test was conducted. Average blocking values may be reported in milliNewtons (mN)/15 millimeters (mm) (or grams per inch). A higher average blocking force value generally reflects a higher adhesion between films and a higher tendency for a film to stick to films of the same or another package or to packaging equipment.

As a yet further example, a packaging film comprising an exterior layer comprising a first polyolefin having a density of less than or equal to 0.925 g/cm$^3$ and a first polyolefin-silicone copolymer may have a static COF of less than 0.50 at 82° C. (180° F.) or a static COF of from 0.1 to less than 0.50 at 82° C. (180° F.) or a static COF of from 0 to less than 0.50 at 82° C. (180° F.).

As used throughout this application, the term "static COF" refers to the stationary resistance of one surface relative to another surface. It may also be referred to as "budging force." It is the ratio of the force required to start to move one surface over another to the total force applied normal to those surfaces. For the present application, static COF was determined in accordance with ASTM D1894-14 ("Standard Test Method for Static and Kinetic Coefficients of Friction of Plastic Film and Sheeting"). Static COF of various packaging films was determined by initiating movement of the exterior surface over a metal surface at various temperatures (as noted in TABLE 8 below). A lower static COF value generally reflects a material that is easier to initially move.

As a yet further example, a packaging film comprising an exterior layer comprising a first polyolefin having a density of less than or equal to 0.925 g/cm3 and a first polyolefin-silicone copolymer may have a kinetic COF of less than 0.50 at 82° C. (180° F.) or a kinetic COF of from 0.1 to less than 0.50 at 82° C. (180° F.) or a kinetic COF of from 0 to less than 0.50 at 82° C. (180° F.).

As used throughout this application, the term "kinetic COF" refers to the moving or sliding resistance of one surface across another surface. It may also be referred to as "friction force." It is the ratio of the force required to move one surface over another to the total force applied normal to those surfaces, once that motion is in progress. For the present application, kinetic COF was determined in accordance with ASTM D1894-14 ("Standard Test Method for Static and Kinetic Coefficients of Friction of Plastic Film and Sheeting"). Kinetic COF of various packaging films was determined by sliding the exterior surface over a metal surface at various temperatures (as noted in TABLE 8). A lower kinetic COF value generally reflects a material that is more "slippery" or that has "hot slip" or "hot COF" and, therefore, slides when heated.

EXAMPLES

To further exemplify the various embodiments of the present application, several example and comparative example packaging films and packages were produced and evaluated for various properties.

TABLE 1 provides information regarding the composition of various blown films. In producing the blown films, various materials were added to the extruders of a blown film line. The blown films had the compositions (with all percentages as approximate weight percent) as shown in TABLE 1. In addition to the materials listed in TABLE 1, various layers included various processing aids as known to a person of ordinary skill in the packaging arts. All but Example 8 were formed by collapsing the tubular extrudate and flattening it upon itself (at layer 7 for Examples 1-7 and Comparative Examples 1-2 and at layer 9 for Examples 9-11) such that the two inner tubular extrudate layers thermally laminated to themselves to form one inner layer.

TABLE 1

| | Layer 1 (interior layer) | Layer 2 | Layer 3 | Layer 4 | Layer 5 | Layer 6 | Layer 7 | Layer 8 | Layer 9 |
|---|---|---|---|---|---|---|---|---|---|
| Example 1 | mLLDPE1 + 5% POSC | tie | Nylon 6 + Nylon 6/6,6 | tie | Nylon 6 + Nylon 6/6,6 | tie | EVA | tie | Nylon 6 + Nylon 6/6,6 |
| Example 2 | mLLDPE1 + 1% POSC | tie | Nylon 6 + Nylon 6/6,6 | tie | Nylon 6 + Nylon 6/6,6 | tie | EVA | tie | Nylon 6 + Nylon 6/6,6 |

TABLE 1-continued

| | | | | | | | | | |
|---|---|---|---|---|---|---|---|---|---|
| Example 3 | mLLDPE1 + 1.75% POSC | tie | Nylon 6 + Nylon 6/6,6 | tie | Nylon 6 + Nylon 6/6,6 | tie | EVA | tie | Nylon 6 + Nylon 6/6,6 |
| Example 4 | mLLDPE1 + 2.5% POSC | tie | Nylon 6 + Nylon 6/6,6 | tie | Nylon 6 + Nylon 6/6,6 | tie | EVA | tie | Nylon 6 + Nylon 6/6,6 |
| Example 5 | mLLDPE2 + LDPE1 + 1% POSC | tie | Nylon 6 + Nylon 6/6,6 | tie | Nylon 6 + Nylon 6/6,6 | tie | EVA | tie | Nylon 6 + Nylon 6/6,6 |
| Example 6 | mLLDPE2 + LDPE1 + 0.5% POSC | tie | Nylon 6 + Nylon 6/6,6 | tie | Nylon 6 + Nylon 6/6,6 | tie | EVA | tie | Nylon 6 + Nylon 6/6,6 |
| Example 7 | mLLDPE2 + LDPE1 + 0.75% POSC | tie | Nylon 6 + Nylon 6/6,6 | tie | Nylon 6 + Nylon 6/6,6 | tie | EVA | tie | Nylon 6 + Nylon 6/6,6 |
| Example 8 | mLLDPE2 + LDPE1 + 1% POSC | tie | Nylon 6 | tie | Nylon 6 | tie | mLLDPE2 + LDPE1 + 1% POSC | | |
| Example 9 | ULDPE1 + 1% POSC | ULDPE | tie | Nylon 6/6,6 + Nylon 6 | EVOH | Nylon 6/6,6 + Nylon 6 | tie | ULDPE | ULDPE1 + 5% POSC |
| Example 10 | mLLDPE3 + 1% POSC | mLLDPE | tie | Nylon 6/6,6 + Nylon 6 | EVOH | Nylon 6/6,6 + Nylon 6 | tie | mLLDPE | mLLDPE3 + 5% POSC |
| Example 11 | LLDPE1 + 1% POSC | LLDPE | tie | Nylon 6 + Nylon 6/6,6 | EVOH | Nylon 6 + Nylon 6/6,6 | tie | LLDPE | LLDPE1 + 5% POSC |
| Comparative Example 1 | mLLDPE1 | tie | Nylon 6 + Nylon 6/6,6 | tie | Nylon 6 + Nylon 6/6,6 | tie | EVA | tie | Nylon 6 + Nylon 6/6,6 |
| Comparative Example 2 | mLLDPE2 + LDPE1 | tie | Nylon 6 + Nylon 6/6,6 | tie | Nylon 6 + Nylon 6/6,6 | tie | EVA | tie | Nylon 6 + Nylon 6/6,6 |

| | Layer 10 | Layer 11 | Layer 12 | Layer 13 | Layer 14 | Layer 15 | Layer 16 | Layer 17 |
|---|---|---|---|---|---|---|---|---|
| Example 1 | tie | Nylon 6 + Nylon 6/6,6 | tie | mLLDPE1 + 5% POSC | | | | |
| Example 2 | tie | Nylon 6 + Nylon 6/6,6 | tie | mLLDPE1 + 1% POSC | | | | |
| Example 3 | tie | Nylon 6 + Nylon 6/6,6 | tie | mLLDPE1 + 1.75% POSC | | | | |
| Example 4 | tie | Nylon 6 + Nylon 6/6,6 | tie | mLLDPE1 + 2.5% POSC | | | | |
| Example 5 | tie | Nylon 6 + Nylon 6/6,6 | tie | mLLDPE2 + LDPE1 + 1% POSC | | | | |
| Example 6 | tie | Nylon 6 + Nylon 6/6,6 | tie | mLLDPE2 + LDPE1 + 0.5% POSC | | | | |
| Example 7 | tie | Nylon 6 + Nylon 6/6,6 | tie | mLLDPE2 + LDPE1 + 0.75% POSC | | | | |
| Example 8 | | | | | | | | |
| Example 9 | ULDPE | tie | Nylon 6/6,6 + Nylon 6 | EVOH | Nylon 6/6,6 + Nylon 6 | tie | ULDPE | ULDPE1 + 1% POSC |
| Example 10 | mLLDPE | tie | Nylon 6/6,6 + Nylon 6 | EVOH | Nylon 6/6,6 + Nylon 6 | tie | mLLDPE | mLLDPE3 + 1% POSC |
| Example 11 | LLDPE | tie | Nylon 6 + Nylon 6/6,6 | EVOH | Nylon 6 + Nylon 6/6,6 | tie | LLDPE | LLDPE1 + 1% POSC |
| Comparative Example 1 | tie | Nylon 6 + Nylon 6/6,6 | tie | mLLDPE | | | | |
| Comparative Example 2 | tie | Nylon 6 + Nylon 6/6,6 | tie | mLLDPE2 + LDPE1 | | | | | mLLDPE1 was Exceed™ 3812 CB, metallocene-catalyzed linear low density polyethylene having a reported density of 0.912 g/cm$^3$ and available from ExxonMobil Chemical Company (Houston, Tex.). mLLDPE2 was Exceed™ 3518 CB, metallocene-catalyzed linear low density polyethylene having a reported density of 0.918 g/cm$^3$ and available from ExxonMobil Chemical Company (Houston, Tex.). mLLDPE3 was Exceed™ XP 6026ML, metallocene-catalyzed linear low density polyethylene having a reported density of 0.916 g/cm$^3$ and available from ExxonMobil Chemical Company (Houston, Tex.). LDPE1 was Petrothene NA963083, low density polyethylene having a reported density of 0.919 g/cm$^3$ and available from LyondellBasell Industries Holdings, B.V. (Houston, Tex.). ULDPE1 was Attane™ NG 4701G, ultra low density polyethylene having a reported density of 0.912 g/cm$^3$ and available from The Dow Chemical Company (Midland, Mich.). LLDPE1 was Dowlex™ 2645, linear low density polyethylene having a reported density of 0.918 g/cm$^3$ and available from The Dow Chemical Company (Midland, Mich.).

Example 1 and Comparative Example 1 were evaluated for water contact angle. TABLE 2 reports the results.

TABLE 2

| | Water Contact Angle (°) |
|---|---|
| Example 1 | 91° ± 0.5° |
| Comparative Example 1 | 91° ± 1.6° |

As reported in TABLE 2, the addition of POSC to the exterior layer of Example 1 did not significantly affect the water contact angle of the film as compared to a film not comprising POSC in the exterior layer (as in Comparative Example 1). The exterior surface of each of Example 1 and Comparative Example 1 was considered to be hydrophobic.

Figure 9:
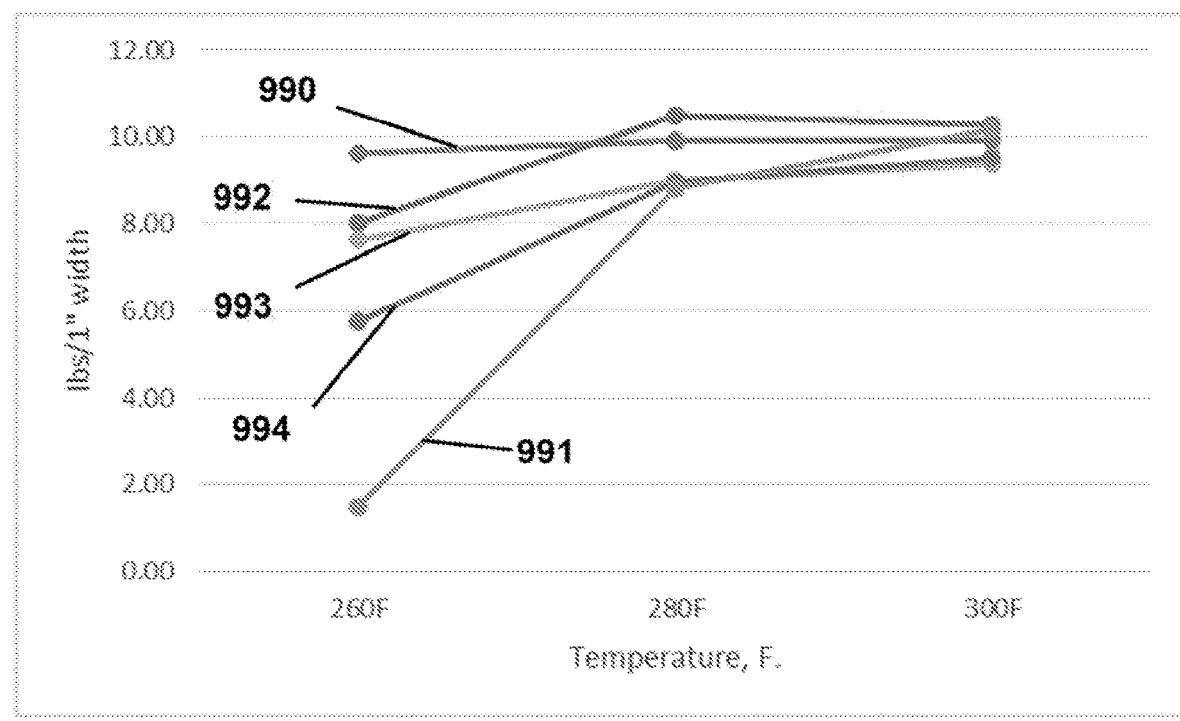
FIG. 9 is a graph showing the peak seal strength curve for various examples and a comparative example at various seal temperatures.

Examples 1-6 and Comparative Examples 1-2 were evaluated for peak seal strength. Example 1 and Comparative Example 1 were included in two data sets of peak seal strength data: Data Set 1 included only Example 1 and Comparative Example 1, and Data Set 2 included Examples 1-4 and Comparative Example 1. An additional data set included Examples 5-6 and Comparative Example 2. TABLE 3 reports the average results of various peak seal strength determinations.

packaging films of the present application (i.e., Examples 1-6) did not significantly affect the peak seal strength of the film as compared to a film not comprising POSC in the interior layer (as in Comparative Examples 1 and 2). (The peak seal strength of Example 1—Set 1 at 138° C. (280° F.) reported as 20.99 N/15 mm (7.99 pounds/inch) was considered to be substantively identical to a peak seal strength of at least 21 N/15 mm (8 pounds/inch).) The addition of POSC had no significant effect on peak seal strength. FIG. 9 also illustrates this finding. FIG. 9 is a graph showing the peak seal strength curve for various examples and a comparative

TABLE 3

| | Peak Seal Strength N/15 mm (pounds/inch) seal temperature | | | | | | |
|---|---|---|---|---|---|---|---|
| | 104° C. (220° F.) | 110° C. (230° F.) | 116° C. (240° F.) | 121° C. (250° F.) | 127° C. (260° F.) | 132° C. (270° F.) | 138° C. (280° F.) |
| Example 1 - Set 1 | | | | 2.02 (0.77) | 11.93 (4.54) | 18.62 (7.09) | 20.99 (7.99) |
| Comparative Example 1 - Set 1 | 15.53 (5.91) | 19.86 (7.56) | 20.15 (7.67) | 21.20 (8.07) | 21.12 (8.04) | 21.15 (8.05) | 21.23 (8.08) |
| Example 1 - Set 2 | | | | | 3.86 (1.47) | | 23.12 (8.80) |
| Example 2 | | | | | 21.07 (8.02) | | 27.56 (10.49) |
| Example 3 | | | | | 20.04 (7.63) | | 23.59 (8.98) |
| Example 4 | | | | | 15.10 (5.75) | | 23.51 (8.95) |
| Comparative Example 1 - Set 2 | | | | | 25.30 (9.63) | | 26.09 (9.93) |
| Example 5 | | | | 0.89 (0.34) | | 28.32 (10.78) | |
| Example 6 | | | | 0.45 (0.17) | | 28.84 (10.98) | |
| Comparative Example 2 | | | | 23.41 (8.91) | | 27.50 (10.47) | |

| | Peak Seal Strength N/15 mm (pounds/inch) seal temperature | | | | | | |
|---|---|---|---|---|---|---|---|
| | 143° C. (290° F.) | 149° C. (300° F.) | 154° C. (310° F.) | 160° C. (320° F.) | 166° C. (330° F.) | 171° C. (340° F.) | 177° C. (350° F.) |
| Example 1 - Set 1 | | 21.17 (8.06) | | | | | |
| Comparative Example 1 - Set 1 | | 21.30 (8.11) | | | | | |
| Example 1 - Set 2 | | 26.72 (10.17) | | | | | |
| Example 2 | | 26.98 (10.27) | | | | | |
| Example 3 | | 24.61 (9.37) | | | | | |
| Example 4 | | 25.01 (9.52) | | | | | |
| Comparative Example 1 - Set 2 | | 26.01 (9.90) | | | | | |
| Example 5 | 36.83 (14.02) | | 34.52 (13.14) | | 37.33 (14.21) | | 34.86 (13.27) |
| Example 6 | 36.54 (13.91) | | 37.96 (14.45) | | 37.12 (14.13) | | 37.46 (14.26) |
| Comparative Example 2 | 37.43 (10.25) | | 33.52 (12.76) | | 36.01 (13.71) | | 32.36 (12.32) |

For at least a seal temperature of 138-177° C. (280-350° F.), the addition of POSC to the interior layer of the example (particularly Data Set 2 including Examples 1-4 and Comparative Example 1) at various seal temperatures.

Line 990 of FIG. 9 illustrates the peak seal strength curve (in pounds/inch) for Comparative Example 1 at various seal temperatures. Line 992 of FIG. 9 illustrates the peak seal strength curve (in pounds/inch) for Example 2 at various seal temperatures. Line 993 of FIG. 9 illustrates the peak seal strength curve (in pounds/inch) for Example 3 at various seal temperatures. Line 994 of FIG. 9 illustrates the peak seal strength curve (in pounds/inch) for Example 4 at various seal temperatures. Line 991 of FIG. 9 illustrates the peak seal strength curve (in pounds/inch) for Example 1 at various seal temperatures.

Examples 1-6 and Comparative Examples 1-2 were evaluated for hot tack strength. Example 1 and Comparative Example 1 were included in two data sets of hot tack strength data: Data Set 1 included only Example 1 and Comparative Example 1, and Data Set 2 included Examples 1-4 and Comparative Example 1. An additional data set included Examples 5-6 and Comparative Example 2. TABLE 4 reports the average results of various hot tack strength determinations.

TABLE 4

| | Hot Tack Strength N/15 mm (pounds/inch) seal temperature | | | | | | | |
|---|---|---|---|---|---|---|---|---|
| | 93° C. (200° F.) | 99° C. (210° F.) | 104° C. (220° F.) | 110° C. (230° F.) | 116° C. (240° F.) | 121° C. (250° F.) | 127° C. (260° F.) | 132° C. (270° F.) |
| Example 1 - Set 1 | | | | | | 0.68 (0.26) | 0.84 (0.32) | 1.00 (0.38) |
| Comparative Example 1 - Set 1 | 0.55 (0.21) | 0.95 (0.36) | 1.39 (0.53) | 2.08 (0.79) | 2.89 (1.10) | 2.73 (1.04) | 2.55 (0.97) | 2.60 (0.99) |
| Example 1 - Set 2 | | | | | 0.55 (0.21) | 0.89 (0.34) | 1.21 (0.46) | 1.39 (0.53) |
| Example 2 | | | | 0.55 (0.21) | 1.02 (0.39) | 1.42 (0.54) | 1.73 (0.66) | 1.89 (0.72) |
| Example 3 | | | | 0.58 (0.22) | 1.10 (0.42) | 1.44 (0.55) | 1.58 (0.60) | 1.92 (0.73) |
| Example 4 | | | | 0.66 (0.25) | 1.08 (0.41) | 1.37 (0.52) | 1.39 (0.53) | |
| Comparative Example 1 - Set 2 | | | 1.60 (0.61) | 3.02 (1.15) | 3.20 (1.22) | 3.55 (1.35) | 3.41 (1.30) | 3.31 (1.26) |
| Example 5 | | | | | 0.66 (0.25) | | 2.81 (1.07) | |
| Example 6 | | | | | 0.50 (0.19) | | 2.57 (0.98) | |
| Comparative Example 2 | | | | | 2.78 (1.06) | | 4.07 (1.55) | |

| | Hot Tack Strength N/15 mm (pounds/inch) seal temperature | | | | | | | |
|---|---|---|---|---|---|---|---|---|
| | 138° C. (280° F.) | 143° C. (290° F.) | 149° C. (300° F.) | 154° C. (310° F.) | 160° C. (320° F.) | 166° C. (330° F.) | 171° C. (340° F.) | 177° C. (350° F.) |
| Example 1 - Set 1 | 1.10 (0.42) | 1.21 (0.46) | 1.29 (0.49) | 1.42 (0.54) | 1.37 (0.52) | 1.52 (0.58) | 1.31 (0.50) | 1.13 (0.43) |
| Comparative Example 1 - Set 1 | 2.50 (0.95) | 2.50 (0.95) | 2.55 (0.97) | | | | | |
| Example 1 - Set 2 | 1.60 (0.61) | 1.84 (0.70) | 1.73 (0.66) | 1.47 (0.56) | 1.31 (0.50) | | | |
| Example 2 | 1.97 (0.75) | 2.23 (0.85) | 2.18 (0.83) | 1.76 (0.67) | 1.63 (0.62) | | | |
| Example 3 | 2.10 (0.80) | 2.13 (0.81) | 2.02 (0.77) | 1.76 (0.67) | 1.47 (0.56) | | | |
| Example 4 | 1.68 (0.64) | 1.81 (0.69) | 1.65 (0.63) | 1.55 (0.59) | 1.47 (0.56) | | | |
| Comparative Example 1 - Set 2 | 2.71 (1.03) | 2.44 (0.93) | 2.29 (0.87) | 2.08 (0.79) | 1.79 (0.68) | | | |
| Example 5 | 3.07 (1.17) | | 2.26 (0.86) | | 1.71 (0.65) | | 1.34 (0.51) | 1.26 (0.48) |
| Example 6 | 3.13 (1.19) | | 2.23 (0.85) | | 1.92 (0.73) | | 1.34 (0.51) | 1.21 (0.46) |
| Comparative Example 2 | 3.63 (1.38) | | 2.47 (0.94) | | 1.87 (0.71) | | 1.55 (0.59) | 1.31 (0.50) |

Figure 10:
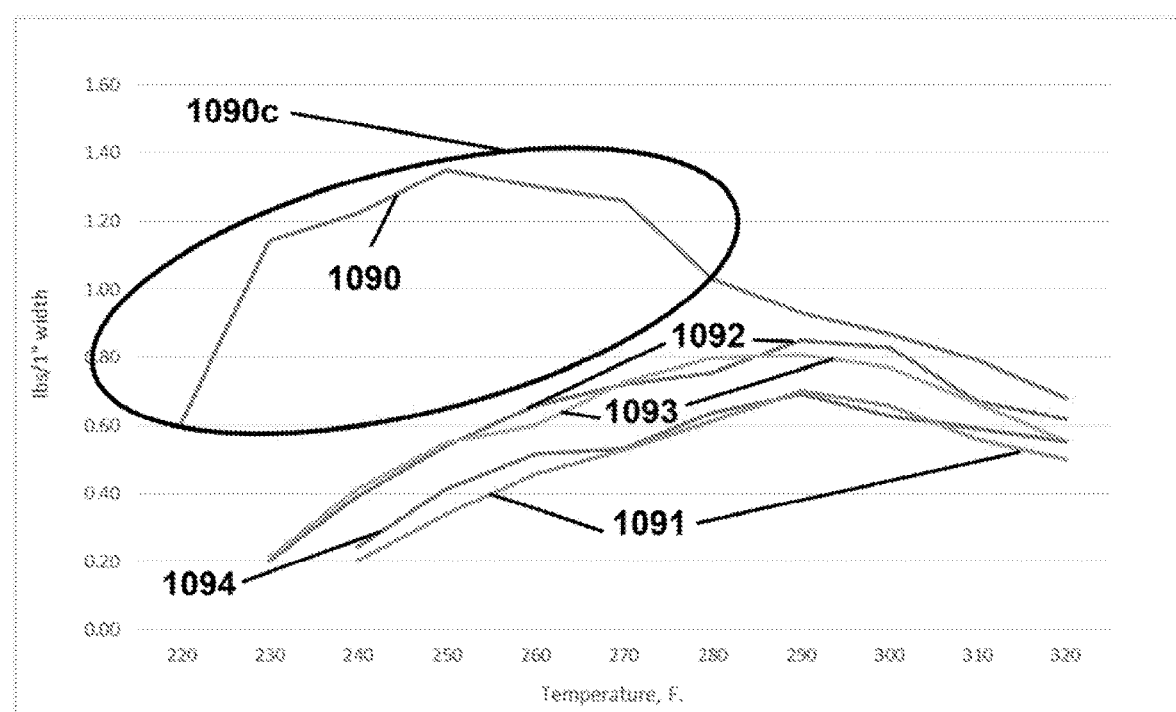
FIG. 10 is a graph showing the hot tack strength curve for various examples and a comparative example at various seal temperatures

For at least a seal temperature of 132-177° C. (270-350° F.), the addition of POSC to the interior layer of the packaging films of the present application (i.e., Examples 1-6) did not significantly affect the hot tack strength of the film as compared to a film not comprising POSC in the interior layer (as in Comparative Examples 1 and 2). The addition of POSC had no significant effect on hot tack strength, and Examples 1-6 exhibited sufficient hot tack strength to maintain seal integrity, for example, during packaging filling operations. FIG. 10 also illustrates this. FIG. 10 is a graph showing the hot tack strength curve for various examples and a comparative example (particularly Data Set 2 including Examples 1-4 and Comparative Example 1) at various seal temperatures. Line 1090 of FIG. 10 illustrates the hot tack strength curve (in pounds/inch) for Comparative Example 1 at various seal temperatures. Line 1092 of FIG. 10 illustrates the hot tack strength curve (in pounds/inch) for Example 2 at various seal temperatures. Line 1093 of FIG. 10 illustrates the hot tack strength curve (in pounds/inch) for Example 3 at various seal temperatures. Line 1094 of FIG. 10 illustrates the hot tack strength curve (in pounds/inch) for Example 4 at various seal temperatures. Line 1091 of FIG. 10 illustrates the hot tack strength curve (in pounds/inch) for Example 1 at various seal temperatures. Additionally, the addition of POSC to Examples 1-4 eliminated the "hot tack hump" of Comparative Example 1. Circle 1090c of FIG. 10 encircles this "hot tack hump." Eliminating the "hot tack hump" increases packaging efficiencies.

Examples 1-6 and Comparative Examples 1-2 were evaluated for average blocking force. Example 1 and Comparative Example 1 were included in three data sets of average blocking force data: Data Set 1 Included Example 1 and Comparative Example 1 at 1.81 kg (4 lbs) pressure in a 93° C. (200° F.) oven for 1 hour; Data Set 2 included Example 1 and Comparative Example 1 at 2.72 kg (6 lbs) pressure in a 93° C. (200° F.) oven for 2 hours and at 2.72 kg (6 lbs) pressure in a 99° C. (210° F.) oven for 2 hours; Data Set 3 included Examples 1-4 and Comparative Example 1 at 2.72 kg (6 lbs) pressure in a 88° C. (190° F.) oven for 2 hours, at 2.72 kg (6 lbs) pressure in a 93° C. (200° F.) oven for 2 hours, and at 2.72 kg (6 lbs) pressure in a 99° C. (210° F.) oven for 2 hours. An additional data set included Examples 5-6 and Comparative Example 2. TABLE 5 reports the average results of various hot tack strength determinations.

TABLE 5

| | Average Blocking Force mN/15 mm (grams/inch) | | | |
|---|---|---|---|---|
| | 1.81 kg (4 lbs) pressure, 93° C. (200° F.) oven for 1 hr | 2.72 kg (6 lbs) pressure, 88° C. (190° F.) oven for 2 hr | 2.72 kg (6 lbs) pressure, 93° C. (200° F.) oven for 2 hr | 2.72 kg (6 lbs) pressure, 99° C. (210° F.) oven for 2 hr |
| Example 1 - Set 1 | 0 (0) | | | |
| Comparative Example 1 - Set 1 | 469.0 (81) | | | |
| Example 1 - Set 2 | | | 0 (0) | 260.6 (45) |
| Comparative Example 1 - Set 2 | | | 7955.5 (1374) | ∞ (∞) |
| Example 1 - Set 3 | | 23.2 (4) | 75.3 (13) | 214.2 (37) |
| Example 2 | | 81.1 (14) | 173.7 (30) | 1094.3 (189) |
| Example 3 | | 63.7 (11) | 156.3 (27) | 706.4 (122) |
| Example 4 | | 40.5 (7) | 110.0 (19) | 347.4 (60) |
| Comparative Example 1 - Set 3 | | 1250.6 (216) | 25354.4 (4379) | ∞ (∞) |
| Example 5 | | 17.4 (3) | 46.3 (8) | 75.3 (13) |
| Example 6 | | 11.6 (2) | 46.3 (8) | 81.1 (14) |
| Comparative Example 2 | | 34.7 (6) | 179.5 (31) | 272.1 (47) |

A value of "0" indicates the packaging films had no tack or seal between them and separated without the application of any force. In other words, the sample fell apart by itself. A value of "∞" indicates the seal between the packaging films could not be separated without destroying the sample. In other words, without destroying the sample, no amount of force was able to separate the seal between the packaging films.

The addition of POSC to the exterior layer of the packaging films of the present application (i.e., Examples 1-6) significantly improved the average block force of the film as compared to a film not comprising POSC in the exterior layer (as in Comparative Examples 1 and 2). The addition of POSC to the exterior layer significantly decreased the average blocking force. Packaging films as described in the present application comprising POSC in the exterior layer exhibited minimal average blocking force so that the films would not stick to films of the same or another package or to the packaging equipment.

To further evaluate the minimal average blocking force of packaging films comprising POSC in the exterior layer, the films of Example and Comparative Example 1 and the films of Example 5 and Comparative Example 2 were used to form lap seal packages filled with heated water. Such packages had a configuration similar to that depicted in FIG. 7 (i.e., comprised a first wall, a first end seal, a second end wall, a contiguous first wall comprising the first seal, and a contiguous second wall). Three sets of packages were formed and filled using Liquiflex® AV-2.2-CB-HF equipment (available from Bemis Company, Inc. (Neenah, Wis.)). TABLE 6 describes the forming and filling conditions.

A value of "n/a" indicates the packages were not evaluated for end-to-end unintended seals for the third set.

The evaluation for unintended seals confirmed that the addition of POSC to the exterior layer of the packaging films of the present application (e.g., Examples 1 and 5) significantly improved the average block force of the film as compared to a film not comprising POSC in the exterior layer (as in Comparative Examples 1 and 2). The addition of

TABLE 6

|  | First set | | Second set |
|---|---|---|---|
|  | Example 1 | Comparative Example 1 | Example 1 |
| Output (packages/min) | 60 | 60 | 60 |
| Seal temperature |  |  |  |
| First seal bar | 170° C. (338° F.) | 170° C. (338° F.) | 170° C. (338° F.) |
| Second seal bar | 175° C. (347° F.) | 175° C. (347° F.) | 175° C. (347° F.) |
| Product filled | 77° C. (170° F.) water | 77° C. (170° F.) water | 82° C. (180° F.) water |
| Filled package size | 510 mm × 475 mm | 510 mm × 475 mm | 510 mm × 475 mm |
| Filled package volume | 3.79 L (1 gal) | 3.79 L (1 gal) | 3.79 L (1 gal) |
| Filled package weight | 3.79 kg (8.36 lbs) | 3.79 kg (8.36 lbs) | 3.79 kg (8.36 lbs) |
| Total packages filled | 111 | 100 | 122 |

|  | Second set | Third set | |
|---|---|---|---|
|  | Comparative Example 1 | Example 5 | Comparative Example 2 |
| Output (packages/min) | 60 | 40 | 40 |
| Seal temperature |  |  |  |
| First seal bar | 170° C. (338° F.) | 175° C. (347° F.) | 175° C. (347° F.) |
| Second seal bar | 175° C. (347° F.) | 180° C. (356° F.) | 180° C. (356° F.) |
| Product filled | 82° C. (180° F.) water | 88° C. (190° F.) water | 88° C. (190° F.) water |
| Filled package size | 510 mm × 475 mm | 510 mm × 475 mm | 510 mm × 475 mm |
| Filled package volume | 3.79 L (1 gal) | 3.79 L (1 gal) | 3.79 L (1 gal) |
| Filled package weight | 3.79 kg (8.36 lbs) | 3.79 kg (8.36 lbs) | 3.79 kg (8.36 lbs) |
| Total packages filled | 129 | 72 | 82 |

The formed and filled packages were then evaluated for unintended seals, i.e., seals or tacks or fusion formed at locations not intended due to excessive average blocking forces of the packaging films. Such unintended seals were formed between the end of one package and the end of another package and between the end of one package and the body (i.e., the first wall or the second wall) of the same or another package. TABLE 7 reports the evaluation of unintended seals.

POSC to the exterior layer significantly decreased the average blocking force such that unintended seals were not formed. Packaging films as described in the present application comprising POSC in the exterior layer exhibited minimal average blocking force so that the films would not stick to films of the same or another package or to the packaging equipment. Reducing the incidence of unintended seals reduces the possibility of pinhole leakers and also makes the packages more visually acceptable.

TABLE 7

|  | First set | | Second set | | Third set | |
|---|---|---|---|---|---|---|
| Unintended seals | Example 1 | Comparative Example 1 | Example 1 | Comparative Example 1 | Example 5 | Comparative Example 2 |
| End to end | 26 | 0 | 25 | 0 | n/a | n/a |
| End to body | 8 | 95 | 18 | 129 | 0 | 80 |
| Total packages with unintended seals (number) | 34 | 95 | 43 | 129 | 0 | 80 |
| Total packages filled | 111 | 100 | 122 | 129 | 72 | 82 |
| Total packages with unintended seals (percent) | 30.6% | 95.0% | 35.2% | 100% | 0% | 97.6% |

Example 1 and Comparative Example 1 were evaluated for static COF and kinetic COF at various temperatures. TABLE 8 reports the average results.

TABLE 8

| | Ambient Temperature | | 66° C. (150° F.) | | 77° C. (170° F.) | | 82° C. (180° F.) | | 88° C. (190° F.) | | 93° C. (200° F.) | |
|---|---|---|---|---|---|---|---|---|---|---|---|---|
| | Static COF | Kinetic COF | Static COF | Kinetic COF | Static COF | Kinetic COF | Static COF | Kinetic COF | Static COF | Kinetic COF | Static COF | Kinetic COF |
| Example 1 | 0.20 | 0.25 | 0.17 | 0.23 | 0.19 | 0.28 | 0.19 | 0.30 | 0.33 | 0.64 | ∞ | ∞ |
| Comparative Example 1 | 0.19 | 0.24 | 0.18 | 0.28 | 0.35 | 0.59 | 0.65 | 1.17 | ∞ | ∞ | ∞ | ∞ |

A value of "∞" indicates the exterior surface of the packaging film could not be moved over the metal surface. In other words, the packaging film "stuck" to the metal surface.

As reported in TABLE 8, the addition of POSC to the exterior layer of the film Example 1 significantly affected the static COF and the kinetic COF of the film as compared to a film without POSC in the exterior layer (as in Comparative Example 1), especially at temperatures greater than 66° C. (150° F.). Specifically, the packaging film of Example 1 has a kinetic COF of less than 0.50 at 82° C. (180° F.). In general, Example 1 is more "slippery" and has "hot slip" and low "hot COF" and, therefore, slides easier when heated as compared to Comparative Example 1.

Each and every document cited in this present application, including any cross-referenced or related patent or application, is incorporated in this present application in its entirety by this reference, unless expressly excluded or otherwise limited. The citation of any document is not an admission that it is prior art with respect to any embodiment disclosed or claimed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application (including the appended claims) governs.

Unless otherwise indicated, all numbers expressing sizes, amounts, ranges, limits, and physical and other properties used in the present application (including the appended claims) are to be understood as being preceded in all instances by the term "about". Accordingly, unless expressly indicated to the contrary, the numerical parameters set forth in the present application (including the appended claims) are approximations that can vary depending on the desired properties sought to be obtained by a person of ordinary skill in the packaging arts without undue experimentation using the teachings disclosed in the present application.

As used in the present application (including the appended claims), the singular forms "a," "an," and "the" encompass embodiments having plural referents, unless the context clearly dictates otherwise. As used in the present application (including the appended claims), the term "or" is generally employed in its sense including and/or, unless the context clearly dictates otherwise.

Spatially related terms, including but not limited to, "lower," "upper," "beneath," "below," "above," "bottom," and "top," if used in the present application (including the appending claims), are used for ease of description to describe spatial relationships of element(s) to another. Such spatially related terms encompass different orientations of the package in use or operation, in addition to the particular orientations depicted in the drawings and described in the present application (including the appended claims). For example, if an object depicted in the drawings is turned over or flipped over or inverted, elements previously described as below or beneath other elements would then be above those other elements.

The description, examples, embodiments, and drawings disclosed are illustrative only and should not be interpreted as limiting. The present invention includes the description, examples, embodiments, and drawings disclosed; but it is not limited to such description, examples, embodiments, or drawings. The reader should assume that features of one disclosed embodiment can also be applied to all other disclosed embodiments, unless expressly indicated to the contrary. Modifications and other embodiments will be apparent to a person of ordinary skill in the packaging arts, and all such modifications and other embodiments are intended and deemed to be within the scope of the present invention as described in the claims.

What is claimed is as follows:

1. A packaging film comprising an exterior layer comprising a blend of a first polyolefin having a density of less than or equal to 0.925 g/cm$^3$ and a first polyolefin-silicone copolymer, wherein the packaging film is adapted for exposure to temperatures from 68° C. to 177° C. (154° F. to 350° F.); and
    wherein the packaging film further comprises an interior layer comprising a blend of a second polyolefin having a density of less than or equal to 0.925 g/cm$^3$ and a second polyolefin-silicone copolymer, and wherein the packaging film has a peak seal strength of at least 21 N/15 mm (8 pounds/inch) when sealed at a seal temperature of 149° C. (300° F.) and a hot tack strength of at least 1 N/15 mm (0.40 pounds/inch) when sealed at a seal temperature of 149° C. (300° F.).

2. The packaging film of claim 1 wherein the first polyolefin has a density of from 0.890 g/cm3 to 0.920 g/cm$^3$.

3. The packaging film of claim 1 wherein the first polyolefin comprises linear low density polyethylene or metallocene linear low density polyethylene.

4. The packaging film of claim 1 wherein the first polyolefin comprises polypropylene copolymer, polypropylene homopolymer, or a blend thereof.

5. The packaging film of claim 1 wherein the exterior layer comprises the first polyolefin-silicone copolymer in an amount from 0.5% to 5.0% by weight of the exterior layer.

6. The packaging film of claim 1 wherein the packaging film further comprises a first polyamide layer positioned between the exterior layer and the interior layer and a second polyamide layer positioned between the first polyamide layer and the interior layer.

7. The packaging film of claim 1 wherein the packaging film further comprises an inner layer comprising a blend of a third polyolefin having a density of less than or equal to 0.925 g/cm³ and a third polyolefin-silicone copolymer.

8. The packaging film of claim 1 wherein the packaging film further comprises at least one additional layer comprising heat stable material, oxygen barrier material, tie material, or a blend thereof.

9. The packaging film of claim 8 wherein the oxygen barrier material comprises polyamide, ethylene vinyl alcohol copolymer, retortable-grade ethylene vinyl alcohol copolymer, foil, oxide-coated polyester, polyglycolic acid, or a blend thereof.

10. The packaging film of claim 1 wherein the packaging film is adapted to package products having temperatures from 68° C. to 110° C. (154° F. to 230° F.).

11. The packaging film of claim 1 wherein the packaging film has an average blocking force of less than 2,316 mN/15 mm (400 g/inch) when subjected to 2.72 kg (6 lbs) pressure in a 99° C. (210° F.) oven for two hours.

12. The packaging film of claim 1 wherein the packaging film has a kinetic COF of less than 0.50 at 82° C. (180° F.).

13. The packaging film of claim 1 wherein the packaging film comprises a blown tubular extrudate that is collapsed and flattened upon itself at two interior tubular extrudate layers and the two interior tubular extrudate layers thermally laminate to themselves to form one inner layer.

14. The packaging film of claim 1 wherein the packaging film comprises at least a first film and a second film wherein the first film is adhesively laminated or thermally laminated to the second film.

15. A package comprising the packaging film of claim 1.

16. A package comprising
(a) a first wall and a second wall, wherein the first wall and the second wall are formed from a packaging film comprising
(i) an exterior layer comprising a blend of a first polyolefin having a density of less than or equal to 0.925 g/cm³ and a first polyolefin-silicone copolymer in an amount from 0.5% to 5.0% by weight of the exterior layer,
(ii) an interior layer comprising a blend of a second polyolefin having a density of less than or equal to 0.925 g/cm³ and a second polyolefin-silicone copolymer in an amount from 0.5% to 5.0% by weight of the interior layer,
(iii) a first polyamide layer positioned between the exterior layer and the interior layer, and
(iv) a second polyamide layer positioned between the first polyamide layer and the interior layer,
wherein a sheet of the packaging film has a sheet first side and an opposing sheet second side, and
wherein the packaging film is adapted to package products having temperatures from 68° C. to 110° C. (154° F. to 230° F.); and
(b) a first seal connecting the sheet first side to the sheet second side, wherein the first seal is a lap seal; and
wherein the packaging film has a peak seal strength of at least 21 N/15 mm (8 pounds/inch) when sealed at a seal temperature of 149° C. (300° F.) and a hot tack strength of at least 1 N/15 mm (0.40 pounds/inch) when sealed at a seal temperature of 149° C. (300° F.).

17. The package of claim 16 wherein the first polyolefin and the second polyolefin comprise the same polyolefin and the first polyolefin-silicone copolymer and the second polyolefin-silicone copolymer comprise the same polyolefin-silicone copolymer.

18. A package comprising
(a) a first wall and a second wall, wherein the first wall and the second wall are formed from a packaging film comprising
(i) an exterior layer comprising a blend of a first polyolefin having a density of less than or equal to 0.925 g/cm³ and a first polyolefin-silicone copolymer in an amount from 0.5% to 5.0% by weight of the exterior layer,
(ii) an interior layer comprising a blend of a second polyolefin having a density of less than or equal to 0.925 g/cm³ and a second polyolefin-silicone copolymer in an amount from 0.5% to 5.0% by weight of the interior layer,
(iii) an inner layer positioned between the exterior layer and the interior layer and comprising a third polyolefin having a density of less than or equal to 0.925 g/cm³ and a third polyolefin-silicone copolymer,
(iv) at least one additional layer compromising an oxygen barrier material and positioned between the exterior layer and the inner layer, and
(v) at least another additional layer compromising an oxygen barrier material and positioned between the inner layer and the interior layer,
wherein the packaging film is adapted to package products having temperatures from 68° C. to 110° C. (154° F. to 230° F.); and
(b) a perimeter seal connecting the first wall to the second wall; and
wherein the packaging film has a peak seal strength of at least 21 N/15 mm (8 pounds/inch) when sealed at a seal temperature of 149° C. (300° F.) and a hot tack strength of at least 1 N/15 mm (0.40 pounds/inch) when sealed at a seal temperature of 149° C. (300° F.).

* * * * *

UNITED STATES PATENT AND TRADEMARK OFFICE
CERTIFICATE OF CORRECTION

PATENT NO. : 11,279,118 B2
APPLICATION NO. : 16/758581
DATED : March 22, 2022
INVENTOR(S) : Scott J. Kelly It is certified that error appears in the above-identified patent and that said Letters Patent is hereby corrected as shown below:

In the Specification

Column 6, Line 20: Delete "acylate" and insert -- acrylate --, therefor.

Column 7, Line 54: Delete "1-buty" and insert -- 1-butyl --, therefor.

Column 9, Line 48: Delete "[C(O)—R—C(O) —NH—R'—NH]," and insert -- [C(O)—R—C(O) —NH—R'—NH]n --, therefor.

Column 16, Line 51: After "Newtons (N)", delete "(" and insert -- / --, therefor.

Signed and Sealed this
Eighteenth Day of April, 2023

Katherine Kelly Vidal
*Director of the United States Patent and Trademark Office*